US010152458B1

(12) United States Patent
Stepaniants et al.

(10) Patent No.: US 10,152,458 B1
(45) Date of Patent: Dec. 11, 2018

(54) SYSTEMS FOR DETERMINING LONG-TERM EFFECTS IN STATISTICAL HYPOTHESIS TESTING

(71) Applicant: AMAZON TECHNOLOGIES, INC., Seattle, WA (US)

(72) Inventors: Serguei B. Stepaniants, Redmond, WA (US); Kyle Leon Battisti, Seattle, WA (US); Rui Chen, Seattle, WA (US); Michael Luis Collado, Seattle, WA (US); Kevin Donald Kelly, Bainbridge Island, WA (US); Sebastian Kohlmeier, Mountlake Terrace, WA (US); Kevin McAlister, Seattle, WA (US); Daniel Parshall, Woodinville, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 558 days.

(21) Appl. No.: 14/661,981

(22) Filed: Mar. 18, 2015

(51) Int. Cl.
G06F 17/18 (2006.01)
G06F 17/10 (2006.01)
G06F 17/30 (2006.01)

(52) U.S. Cl.
CPC .................... *G06F 17/18* (2013.01)

(58) Field of Classification Search
CPC ........................................... G06F 17/18
USPC ............................................. 702/179
See application file for complete search history.

(56) References Cited

U.S. PATENT DOCUMENTS

| 8,234,632 | B1 * | 7/2012 | Hugeback | G06F 11/3495 717/130 |
| 9,195,374 | B1 * | 11/2015 | Meaney | H04L 43/045 |
| 2006/0162071 | A1 * | 7/2006 | Dixon | G06Q 30/02 5/93.1 |
| 2012/0209575 | A1 * | 8/2012 | Barbat | G06F 17/5009 703/2 |
| 2013/0117629 | A1 * | 5/2013 | Reynolds | G06F 11/1008 714/763 |
| 2016/0048855 | A1 * | 2/2016 | Ambrozic | H04L 43/50 705/7.32 |
| 2016/0071162 | A1 * | 3/2016 | Ogawa | G06Q 30/0269 705/14.66 |
| 2016/0253290 | A1 * | 9/2016 | Xu | G06F 17/30905 715/744 |
| 2016/0253311 | A1 * | 9/2016 | Xu | H04L 67/02 715/256 |

* cited by examiner

*Primary Examiner* — Moazzam Hossain
(74) *Attorney, Agent, or Firm* — Lindauer Law, PLLC

(57) ABSTRACT

Described are techniques for determining long-term effects of an experimental change to a user experience after the end of the experiment. A control state and a treatment state of a statistical hypothesis experiment may be assigned to first and second client devices, respectively, during an experiment time period. Subsequent to the end of the experiment, presentation of the control state may be discontinued. Result data corresponding to the treatment state may be determined during the experiment time period and for a length of time subsequent to the experiment time period. Result data corresponding to the control state may be determined during the experiment time period, and for a length of time prior to assignment of the control state to the first client device.

20 Claims, 8 Drawing Sheets

SYSTEMS FOR DETERMINING LONG-TERM EFFECTS IN STATISTICAL HYPOTHESIS TESTING

BACKGROUND

Statistical hypothesis testing, such as "A/B" testing in which user responses to alternative user experiences are tested, may demonstrate initial results that change over time.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
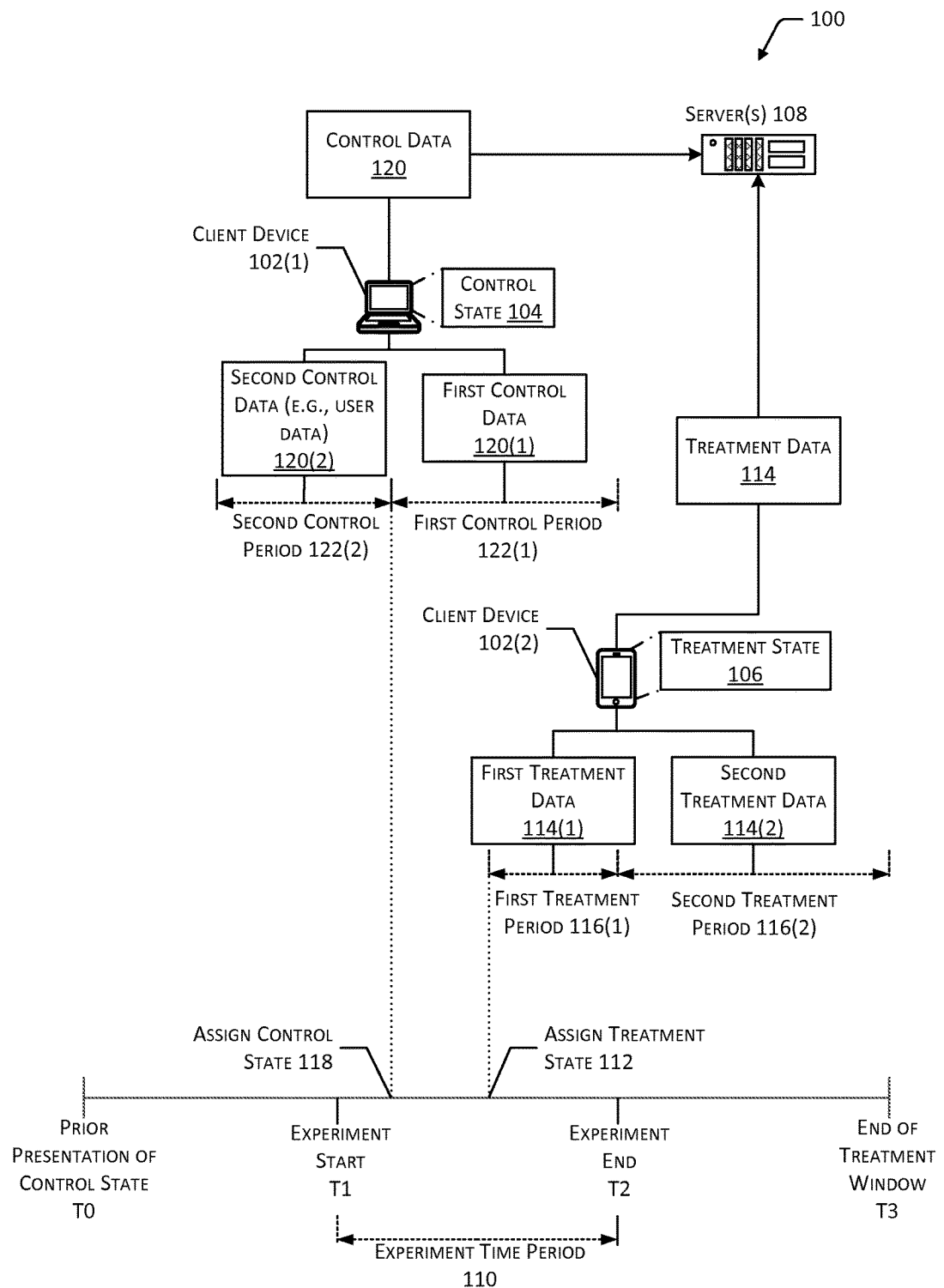
FIG. 1 depicts a timeline illustrating a process for performing a statistical hypothesis experiment within the scope of the present disclosure.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Statistical hypothesis testing is an experimental process in which one of two (or more) variants of a user experience is assigned and presented to multiple users. Responses from the users for an assigned variant are used to determine the effectiveness of that variant. Statistical hypothesis testing may include A/B testing and other similar types of experiments, such as multiple-sample hypothesis, multivariate, or multinomial testing. In some implementations in which A/B testing is performed, the first variant may include an existing user experience, dubbed the control, while the second variant may include one or more modifications to the user experience, dubbed a treatment or test. For example, an existing version of a website or mobile application may include a first feature or set of features (e.g., visual, audio, tactile, or other content with which a user may interact). An experimental version of the website may include a second feature or set of features that differs from the first in at least one aspect, such as the location or color of an interface that may be used to purchase a product. A statistical hypothesis test may be used to determine one or more metrics associated with both versions of the website. The metric(s) determined by the statistical hypothesis test may include a quantity or percentage of users that view or select a link, advertisement, or product, that purchase a product, that initiate a trial subscription for a service, and so forth, for each tested feature or set of features. A statistical hypothesis experiment is typically conducted for a relatively short period of time, such as thirty days. Based on the initial results of the statistical hypothesis test, an individual conducting the experiment may then make a decision regarding whether to implement the experimental version of the website or whether to retain the existing control version of the website.

In some cases, however, the initial results of a statistical hypothesis experiment may change over time, and the long-term effect of the experimental variation may differ substantially from the initial results. For example, users who are presented with an experimental version of a website may show an increased propensity to purchase an expensive product responsive to the features presented on the website, but over the course of the year, the total annual spending of those users may be significantly lower than that of users who were presented with the preexisting version of the website. As another example, a larger number of users presented with an experimental version of a website may purchase a product or initiate a trial period associated with a service when compared to users presented with a preexisting version of the website. However, a significant portion of the users presented with the experimental version of the website may return the purchased product or refrain from initiating a paid subscription for the service at a future time, after the statistical hypothesis experiment has ended. A merchant or other individual that implements a particular version of a website at the conclusion of an experiment, responsive to the perceived short-term benefit indicated by the experimental results, may experience negative results over a longer period of time due to a lack of knowledge of the long-term effects of a feature or set of features. However, it may be impractical and costly to maintain a statistical hypothesis experiment for an extended period of time. Maintaining an experiment for an extended period of time may also prevent an individual from capitalizing on the initial results of the experiment.

This disclosure relates to systems for determining long-term effects of a feature or set of features by using data associated with time periods external to an experiment time period (e.g., before or after an experiment). For example, data may be collected from users that are assigned a preexisting control state both during an experiment and from a time period prior to the experiment. Data regarding the control state may be obtained from time periods prior to the experiment due to the fact that the feature(s) of the control state and data associated with users that accessed the control state existed prior to the start of the experiment. Data may also be collected from users that are assigned an experimental treatment state both during the experiment and from a time period subsequent to the experiment. An individual conducting an experiment may therefore implement a feature or set of features at the conclusion of the experiment, then review the decision to implement the feature(s) at a subsequent time after the long-term effect associated with the feature(s) has been determined from the result data.

As a specific example, an online merchant may offer a trial period to access a service for sixty days, after which a user may elect to begin a paid subscription for the service. The online merchant may initiate an A/B test to compare the effectiveness of two versions of a website with regard to the number of users that elect to initiate the trial period to access the service. Users that elect to begin the trial period during a thirty-day experiment time period may not necessarily accept or decline a paid subscription for the service prior to the end of the experiment. Therefore, at the end of the experiment, the long-term effect of both versions of the website may still be unknown. However, maintaining two versions of the website for an extended period of time may be impractical, cost-prohibitive, and may prevent the merchant from maximizing revenue by implementing a single version of the website at the conclusion of the experiment. Therefore, at the end of the experiment, the merchant may choose to implement the version of the website responsive to which the greatest number of users initiated a trial period for the service. However, an experimental feature or set of features may initially appear to produce negative results, while over a longer period of time, the experimental feature(s) may produce a positive outcome. Similarly, an experimental feature or set of features may initially appear to produce positive results. However, the initial results of an experiment may decay over a longer period of time. For example, the experimental feature(s) may produce no significant change in a desired metric, or a negative outcome, such as decreased long-term spending, conversions, click-throughs, and so forth.

To enable the merchant to determine the long-term effects of both versions of the website after the end of the experiment, additional data from time periods external to the experiment time period may be used. For example, data corresponding to each user's initial exposure to either the control state or the treatment state of a website, and the subsequent sixty days, may be used to determine a quantity or percentage of users that elect to begin a paid subscription for the service responsive to the respective features presented to the users. For users assigned an experimental treatment state, result data may be determined from the time that the user(s) were assigned the treatment state until the end of the experiment time period. However, users that are assigned the treatment state may not necessarily purchase or decline to purchase a paid subscription for the service prior to the end of the experiment. Users assigned the treatment state may be monitored for an additional length of time subsequent to the end of the experiment until result data corresponding to sixty days has been determined for each user assigned the treatment state.

For users assigned a preexisting control state, result data may be determined from the time that the user(s) were assigned the control state until the end of the experiment time period. However, statistical validity of the experiment may be improved by using result data for control subjects that also corresponds to a sixty day length of time. Users that are assigned the control state during the experiment time period may not generate result data corresponding to sixty days. Result data for users assigned the control state may be determined from a length of time prior to the beginning of the experiment due to the fact that the feature(s) presented in the control state existed prior to the experiment. For example, result data corresponding to a user assigned the control state on the fifteenth day of an experiment time period may be determined from the final fifteen days of the experiment time period and from the forty-five days preceding that user's assignment of the control state.

Different users may be assigned one of the control state or the treatment state at different times, based on the particular time at which each user first accesses a user experience during the experiment. In some implementations, time data indicative of a variation in one or more metrics of the result data may be used to modify the result data. For example, result data for a first user may include a time period that spans one or more holidays, weekends, and so forth. Result data for a second user may not include the same holidays or the same number of weekends. Time data corresponding to one or both time periods may be used to determine variations in the result data that may have occurred due to one or more factors associated with those time periods. Based on the time data, the result data for one or more of the first or second user may be modified. For example, the time data may indicate that a period of time that includes one or more holidays may result in an increase in consumer subscriptions for services. Based on the time data, the result data corresponding to time periods that include the one or more holidays may be modified in a negative direction to account for the effect of the holidays on metrics related to consumer subscriptions.

In some implementations, the result data may be output in the form of a graph that associates determined metric values with particular days or other segments of time on which user responses to features occurred. For example, result data for a sum of users may be normalized based on the day on which a user was first presented a feature or set of features. A graph may include a representation of the sum or average of a metric value for a set of users (e.g., users to which the control state was assigned) on the first day corresponding to the result data, the second day, the third day, and so forth. Similarly, a graph may associate metric values for users assigned the treatment state with particular days or other segments of time. In other implementations, the difference between the sum or average metric values for the control state and that of the treatment state may be calculated for each day or other segment of time. The graph may associate the difference between the metric values for the feature states with the particular days or segments of time. From graphs or other representations of the result data, a long-term effect of an experimental treatment state may be determined. A long-term effect may include a rate of change of one or more metrics, a steady state corresponding to one or more metrics, and so forth. For example, the long-term effect may indicate that an initial increase in conversions is decreasing over time, that an initial decrease in conversions is increasing over time, or that the number of conversions responsive to a treatment state has reached a generally constant value.

FIG. 1 depicts a timeline 100 illustrating a process for performing a statistical hypothesis experiment within the scope of the present disclosure. A statistical hypothesis experiment may include the assignment of one of two or more experiment states to multiple client devices 102. An experiment state may include any manner of data that manifests itself as content or features seen, heard, or otherwise interacted with by one or more users of the client devices 102. For example, experiment states may include a preexisting control state 104, such as a feature or set of features of an existing user experience, and an experimental treatment state 106, which may include a user experience having one or more features that differ from the control state 104. A user experience may include a webpage or another type of content that contains features associated with the experiment states, responsive to which a user may interact. The client device(s) 102 may include, without limitation, one or more mobile devices, smartphones, set-top boxes, tablet computers, personal computers, wearable computers, or other types of computing devices. For example, FIG. 1 depicts a first client device 102(1), to which the control state 104 has been assigned, as a portable computer. FIG. 1 depicts a second client device 102(2), to which the treatment state 106 has been assigned, as a smartphone. One or more servers 108 or other types of computing devices may be used to store experiment states, assign experiment states to client devices 102, and determine a distribution of the control state 104 and the treatment state 106 among the client devices 102. For example, the server(s) 108 may allocate the control state 104 to fifty percent of the client devices 102 and the treatment state 106 to fifty percent of client devices 102 that access the user experience during the statistical hypothesis experiment. While FIG. 1 depicts two example client devices 102, any number of client devices 102 may access the user experience during the statistical hypothesis experiment and be assigned one of the control state 104 or the treatment state 106 based on the experiment parameters.

The statistical hypothesis experiment may be conducted during an experiment time period 110, which may be defined by an experiment start T1 and an experiment end T2. For example, the experiment time period 110 may be thirty days in length. During the experiment time period 110, both the control state 104 and the treatment state 106 may be assigned to client devices 102 by the server(s) 108, in a ratio determined by the terms of the experiment. Prior to the experiment start T1, the treatment state 106 may not yet be assigned to any client devices 102, and each client device 102 accessing the user experience may be presented with the control state 104. For example, the timeline 100 includes a length of time associated with prior presentation of the control state T0, prior to the experiment start T1. Subsequent to the experiment end T2, an individual conducting the experiment may choose to continue assigning both the control state 104 and the treatment state 106 to client devices 102 at a selected ratio, to assign only the treatment state 106 to client devices 102, or to assign only the control state 104 to client devices 102. The experiment states assigned to client devices 102 subsequent to the experiment end T2 may be selected based on the initial results of the experiment.

In some implementations, the experiment may be configured to determine metrics associated with both short-term and long-term effects of the experiment states. For example, the experiment may determine a count or percentage of client devices 102 to which the control state 104 and treatment state 106 were assigned that initiated a trial period for a service or purchased a product during the experiment time period 110. The experiment may also determine effects of the experiment states that may occur after the experiment end T2. For example, the experiment may determine a count or percentage of client devices 102 to which the control state 104 and treatment state 106 were assigned that initiated a paid subscription for a service, returned a product, or purchased one or more additional products after the experiment end T2. The effects of the experiment states after the experiment end T2 may be determined for a selected period of time, such as an additional thirty or sixty days subsequent to the experiment end T2. FIG. 1 denotes this selected period of time as the end of the treatment window T3.

The second client device 102(2) may be assigned the treatment state 106 during the experiment time period 110. The assignment of the treatment state 112 may occur at any time between the experiment start T1 and the experiment end T2. When the second client device 102(2) accesses the user experience, the treatment state 106 may be presented to a user of the second client device 102(2). Subsequent to assignment of the treatment state 112 to the second client device 102(2), the treatment state 106 may be presented to the user on each occasion that the second client device 102(2) accesses the user experience.

First treatment data 114(1) may be determined during a first treatment period 116(1) between the assignment of the treatment state 112 and the experiment end T2. The first treatment data 114(1) may include values corresponding to one or more metrics determined by the experiment. For example, the first treatment data 114(1) may include a number of client devices 102 to which the treatment state 106 was assigned that positively or negatively responded to an offer to purchase a product or initiate a trial period for a service during the experiment time period 110. The first treatment data 114(1) may also include an indication of the specific day or another segment of time (e.g., hour) during which the positive or negative response was received from each client device 102 by the server(s) 108.

Second treatment data 114(2) may be determined during a second treatment period 116(2) subsequent to the experiment end T2. The second treatment data 114(2) may also include values corresponding to one or more metrics determined by the experiment. For example, the second treatment data 114(2) may include a number of client devices 102 to which the treatment state 106 was assigned that positively or negatively responded to an offer to purchase additional products, to return a product, to initiate a paid subscription for a service after the expiration of a trial period, and so forth. The second treatment data 114(2) may also include an indication of the day or other segment of time during which the response was received from the client device(s) 102. The first treatment data 114(1) and second treatment data 114(2) may be provided to the server(s) 108 for determining result data corresponding to the experiment.

The length of the first treatment period 116(1) and that of the second treatment period 116(2) may be determined based on the specific time within the experiment time period 110 at which the treatment state 106 was assigned to a client device 102. For example, the total length of time represented by the first treatment period 116(1) and second treatment period 116(2) may be sixty days, while the experiment time period 110 is thirty days. If a client device 102 is assigned the treatment state 106 at the experiment start T1, the first treatment period 116(1) (which would constitute the entire experiment time period 110) would be thirty days, while the second treatment period 116(2) would be thirty days, subsequent to the experiment end T2. If a client device 102 is assigned the treatment state 106 at the experiment end T2, the first treatment period 116(1) would be have a length of one day, while the second treatment period 116(2) would have a length of fifty-nine days, subsequent to the experiment end T2.

The first client device 102(1) may be assigned the control state 104 during the experiment time period 110. The assignment of the control state 118 may occur at any time between the experiment start T1 and the experiment end T2. Subsequent to assignment of the control state 104 to the first client device 102(1), the control state 104 may be presented to the user on each occasion that the first client device 102(1) accesses the user experience.

First control data 120(1) may be determined during a first control period 122(1) between the assignment of the control state 118 and the experiment end T2. The first control data 120(1) may include values corresponding to the one or more metrics determined by the experiment. For example, the first control data 120(1) may include a number of client devices 102 to which the control state 104 was assigned that positively or negatively responded to one or more of an offer to purchase a product, initiate a trial period for a service, an offer to purchase additional products, an offer to return a product, or an offer to initiate a paid subscription for a service after expiration of a trial period. The first control data 120(1) may also include an indication of the day or other segment of time during which the positive or negative response was received from each client device 102 by the server(s) 108.

Second control data 120(2) may be determined based on a second control period 122(2), at least a portion of which may have occurred prior to the experiment start T1. At least a portion of the second control data 120(2) may include existing user data indicative of user interactions responsive to the control state 104 due to the fact that the features associated with the control state 104 were presented to client devices 102 prior to the experiment start T1. The user interactions associated with the existing user data may include user interactions that occurred prior to the assignment of the control state 118 to the first client device 102(1), and in some implementations, prior to the experiment start T1. The second control data 120(2) may also include a number of client devices 102 to which the control state 104 was assigned that positively or negatively responded to the offer to purchase a product, initiate a trial period for a service, purchase additional products, return a product, or initiate a paid subscription for a service after expiration of a trial period. The second control data 120(2) may also include an indication of the day or other segment of time during which the positive or negative response was received from each client device 102 by the server(s) 108. The first control data 120(1) and second control data 120(2) may be provided to the server(s) 108 for determining result data corresponding to the experiment.

The length of the first control period 122(1) and that of the second control period 122(2) may be determined based on the specific time within the experiment time period 110 at which the control state 104 was assigned to a client device 102. For example, the total length of time represented by the first control period 122(1) and the second control period 122(2) may be selected to equal that represented by the first treatment period 116(1) and second treatment period 116(2). As described previously, an example total length of time represented by the treatment periods 116 may be sixty days, while the experiment time period 110 is thirty days. If a client device 102 is assigned the control state 104 at the experiment start T1, the first control period 122(1) (which would constitute the entire experiment time period 110) would be thirty days, while the second control period 122(2) would have a length of thirty days prior to the assignment of the control state 118 (and prior to the experiment start T1). If a client device 102 is assigned the control state 104 at the experiment end T2, the first control period 122(1) would be one day, while the second control period 122(2) would have a length of fifty-nine days prior to the assignment of the control state 118. Thirty days of the second control period 122(2) would also occur prior to the experiment start T1.

Using control data 120 determined from time periods prior to assignment of the control state 118 and in some implementations, prior to the experiment start T1, and using treatment data 114 determined from time periods subsequent to the experiment end T2, long-term effects of a statistical hypothesis experiment may be determined, even though the experiment, itself, is confined to the experiment time period 110.

Figure 2:
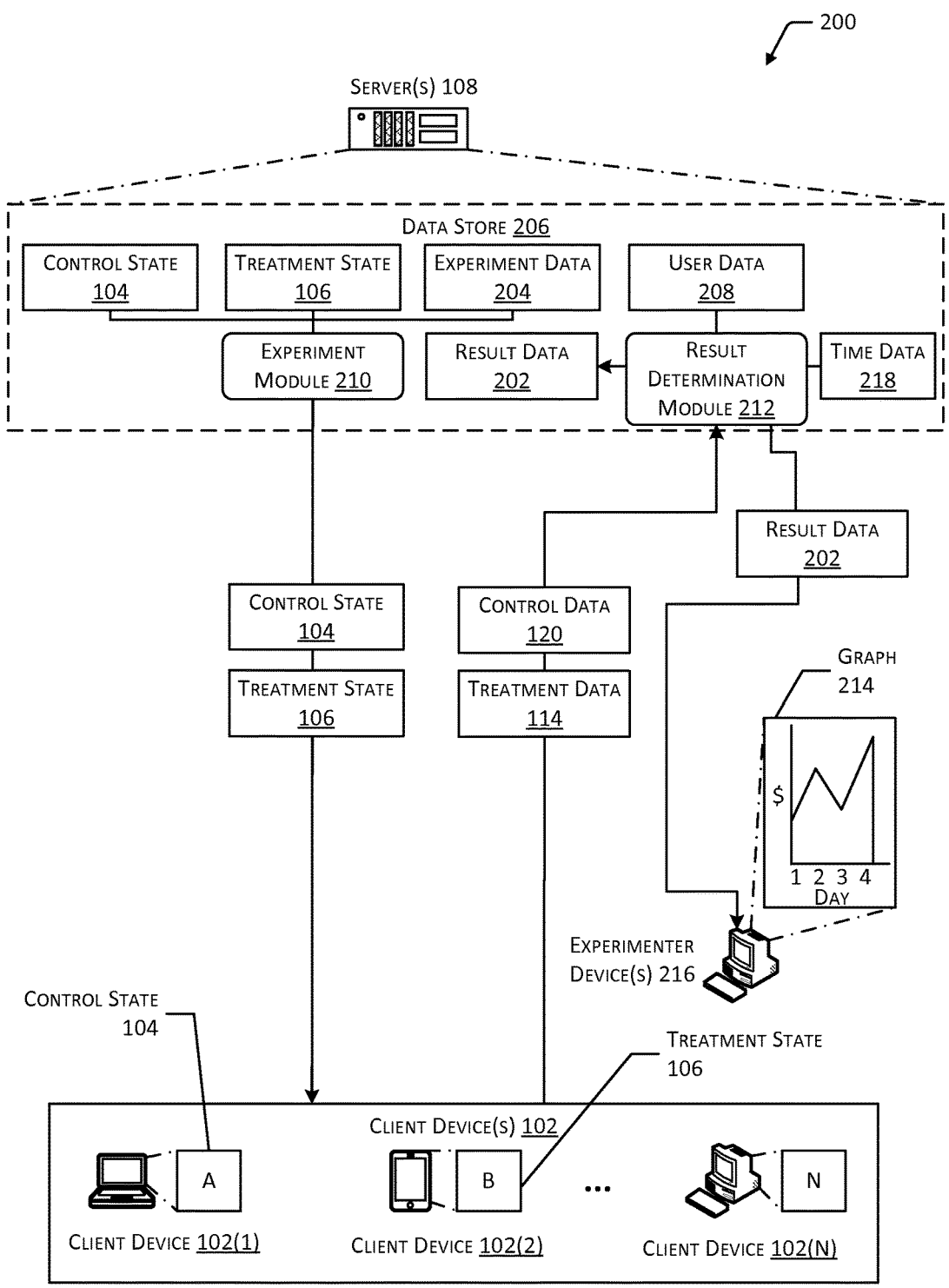
FIG. 2 depicts a system for determining result data for a statistical hypothesis experiment from client devices to which experiment states have been assigned.

FIG. 2 depicts a system 200 for determining result data 202 for a statistical hypothesis experiment from client devices 102 to which experiment states have been assigned. As described previously with regard to FIG. 1, one or more servers 108 or other computing devices may be used to assign and provide one or more of a control state 104 or a treatment state 106 to multiple client devices 102. For example, the control state 104 of a user experience may be presented to a first client device 102(1), while the treatment state 106 of the user experience may be presented to a second client device 102(2). Experiment states may be assigned to any number of client devices 102. In some implementations, each client device 102 that accesses the user experience during the experiment time period 110 may be assigned one or more of the control state 104 or the treatment state 106. In other implementations, certain experiment states may be limited to presentation using certain types of client devices 102, certain geographic areas in which the client devices 102 are located, certain demographic characteristics of one or more user associated with the client devices 102, and so forth.

Experiment data 204, which may be stored in a data store 206 associated with the server(s) 108, may include experimental parameters regarding assignment of the control state 104 and the treatment state 106 to client devices 102. For example, the experiment data 204 may include an allocation ratio indicative of the percentage of client devices 102 that are to be assigned the control state 104 and the percentage of client devices 102 that are to be assigned the treatment state 106. The experiment data 204 may also include parameters such as the length of the experiment time period 110, the specific times of the experiment start T1, the experiment end T2, and the end of treatment window T3. The experiment data 204 may further include one or more limitations regarding the assignment of one or more of the control state 104 or the treatment state 106 to client devices 102. For example, certain experiment states may not be compatible with certain types of client devices 102, certain software executed by particular client devices 102, and so forth. As another example, an individual conducting an experiment may elect to limit use of certain experiment states to certain geographical regions, to users having certain demographic characteristics, and so forth. User data 208, which may be stored in the data store 206 or determined from one or more of the client devices 102, may include data indicative of the geographical regions in which the client devices 102 are located, characteristics associated with users or user accounts, and so forth. An experiment module 210, associated with the server(s) 108, may assign one or more of the control state 104 or the treatment state 106 to client devices 102 based at least partially on the experiment data 204 and in some implementations, based at least partially on the user data 208.

As described previously with regard to FIG. 1, a client device 102 that accesses the user experience during the experiment time period 110 may be assigned the control state 104 or the treatment state 106 for the duration of the experiment. Treatment data 114 may be determined from client devices 102 to which the treatment state 106 has been assigned. The treatment data 114 may be determined based on user interactions, such as a purchase of a good or service or the initiation of a trial period for a service. The user interactions may occur during the experiment time period 110, which may include any time subsequent to assignment of the treatment state 112 and prior to the experiment end T2. The user interactions may also occur subsequent to the experiment end T2, within the second treatment period 116(2).

Control data 120 may be determined from client devices 102 to which the control state 104 has been assigned. The control data 120 may also be determined based on user interactions, such as purchase of a good or service or the initiation of a trial period for a service. The user interactions responsive to the control state 104 may occur during the experiment time period 110, which may include any time subsequent to assignment of the control state 118 and prior to the experiment end T2. The user interactions may also occur prior to assignment of the control state 118 and in some implementations, prior to the experiment start T1.

Because the control state 104 may be presented to client devices 102 prior to the experiment start T1, data corresponding to user interactions responsive to the control state 104 that occurred prior to assignment of the control state 118 or prior to the experiment start T1 may be determined from one or more of the client devices 102 or from the server(s) 108. For example, the user data 208 may include one or more of a purchase history, a search history, a browsing history, or other data indicative of user interactions responsive to a preexisting control state 104 associated with a user experience.

Based at least partially on one or more of the treatment data 114, control data 120, or user data 208 determined from the client devices 102 or stored in the data store 206, a result determination module 212 associated with the server(s) 108 may determine the result data 202. The result data 202 may include values corresponding to one or more metrics indicated in the experiment data 204. For example, the result data 202 may indicate a difference between a count or percentage of client devices 102 to which the control state 104 was assigned and a count or percentage of client devices 102 to which the treatment state 106 was assigned, that responded positively or negatively to a particular feature of the user experience. Continuing the example, the result data 202 may indicate user interactions received from client devices 102 to which the control state 104 was assigned, in which a user views or selects a link, advertisement, or product, purchases a product or service, or initiates a trial subscription for a service. The result data 202 may further indicate user interactions received from client devices 102 to which the treatment state 106 was assigned, in which a user similarly views or selects content, purchases a product or service, or initiates a trial subscription for a service. The result data 202 may additionally include one or more variations between user interactions that were received responsive to the control state 104 and those that were received responsive to the treatment state 106. The experiment data 204 may include one or more threshold values that a variation between the control state 104 and the treatment state 106 may exceed to indicate statistical significance. For example, based on the experiment data 204, the result determination module 212 may disregard minor variations between user interactions received responsive to the control state 104 and the treatment state 106 as statistically insignificant if the variations are less than the threshold values.

The result data 202 may be stored in the data store 206 for subsequent access. In some implementations, the result data 202 may be used to generate one or more tables, charts, reports, or other types of output that may be provided to an output device. In one implementation, the result data 202 may be used to generate a graph 214 associating one or more metric values associated with the control state 104, the treatment state 106, or the determined difference between the control state 104 and the treatment state 106, and the time associated with the values or the determined difference between the values. For example, the result determination module 212 may determine the sum or average for a particular metric associated with the control state 104 on the first day that the control state 104 was presented to one or more client devices 102. An example metric may include a quantity of currency spent by users associated with the client devices 102 responsive to one or more features of the control state 104. The result determination module 212 may also determine the sum or average of the quantity of currency associated with the treatment state 106 on the first day that the treatment state 106 was presented to one or more client devices 102. The result determination module 212 may further determine a difference between the metric value(s) associated with the control state 104 and those associated with the treatment state 106 on the first day the experiment states were presented to one or more of the client devices 102. This process may be repeated for the second day that experiment states were presented to respective client devices 102, the third day, and so forth. The graph 214 may therefore associate selected metric values with the days on which user responses that generated those metric values occurred. In other implementations, the graph 214 may associate metric values with other time periods, such as hours, weeks, months, and so forth. Graphs 214, or other types of output based on the result data 202, such as tables, charts, and so forth, may be provided to one or more experimenter devices 216 associated with individuals conducting the statistical hypothesis experiment. Experimenter devices 216 may include mobile devices, smartphones, set-top boxes, tablet computers, personal computers, wearable computers, or other types of computing devices. In some implementations, result data 202 may be used automatically, independent of the output provided to an experimenter device 216. For example, responsive to result data 202 indicative of user responses to prices, packaging, quantities of items sold as a group, visual features of a website, and so forth, a computing device may automatically modify one or more aspects of a website, item, or service. Continuing the example, based on result data 202 indicating increased sales of packages containing five items when compared to packages containing six items, a website may be modified to present packages containing five items to users for purchase.

As described previously, because different users may be assigned one of the control state 104 or the treatment state 106 at different times, in some implementations, time data 218 indicative of a variation in one or more metrics of the result data 202 may be used to modify the result data 202. For example, one or more of the first control period 122(1), the second control period 122(2), the first treatment period 116(1), or the second treatment period 116(2) may include a time period that spans one or more holidays, weekends, event launches for a particular product, special events, natural disasters, inclement weather, and so forth. Time data 218 corresponding to one or more time periods may be used to determine variations in the result data 202 that may have occurred due to one or more factors associated with those time periods. Based on the time data 218, the result data 202 may be modified. For example, the time data 218 may indicate that a holiday occurring during the second treatment period 116(2) may increase sales of a particular product by ten percent. Based on the time data 218, determined metric values associated with sales of the product during the second treatment period 116(2) may be reduced to account for the effect of the holiday.

Figure 3:
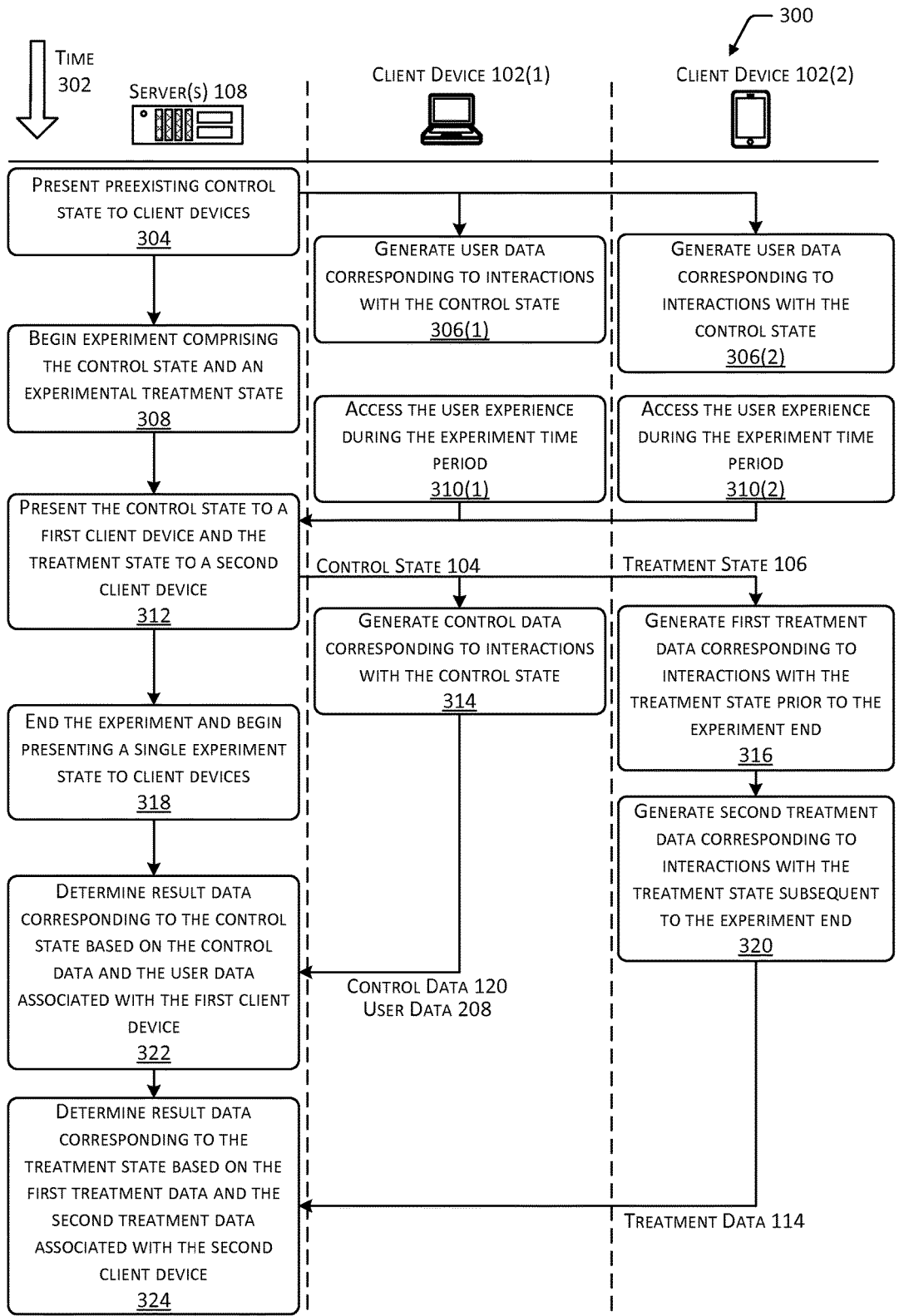
FIG. 3 is a flow diagram illustrating one possible implementation of the flow of data between one or more servers implementing an experiment and one or more client devices.

FIG. 3 is a flow diagram 300 illustrating one possible implementation of the flow of data between one or more servers 108 implementing an experiment and one or more client devices 102. The progression of time 302 is illustrated along the vertical axis, with time increasing toward the downward direction.

Block 304 illustrates presentation of a preexisting control state 104 to one or more client devices 102. Prior to the initiation of an experiment (e.g., the experiment start T1), features corresponding to the control state 104 may be presented to each client device 102 that accesses a user experience. Before the experiment start T1, features corresponding to the treatment state 106 may not yet have been designed or implemented, or the treatment state 106 may have not yet been presented to any client devices 102.

Block 306(1) illustrates the first client device 102(1) generating user data 208 corresponding to interactions with the control state 104. Block 306(2) illustrates the second client device 102(2) also generating user data 208 corresponding to interactions with the control state 104. As described previously, users associated with client devices 102 to which the control state 104 is presented prior to the experiment start T1 may respond to or otherwise interact with the features of the control state 104. User data 208 associated with the client devices 102 may include first control data 120(1) indicative of user responses, interactions, or metric values associated with the control state 104. For example, the user data 208 may include a purchase history, a search history, a browsing history, and so forth, associated with a client device 102 or a user of the client device 102. Continuing the example, the user data 208 may indicate a user's selection of a link, advertisement, or product; a user's purchase of a product or service; a user's initiation of a trial subscription for a service; and so forth. In some implementations, a statistical hypothesis experiment may include multiple treatment states 106 and may not include a control state 104. User data 208 indicative of interactions of a client device 102 with the control state 104 would therefore not be relevant to the experiment. In other implementations, one or more client devices 102 may not be presented with a control state 104 prior to the beginning of an experiment time period 110. For example, the first instance at which a particular client device 102 accesses a user experience may occur during the experiment time period 110. Therefore, user data 208 indicative of previous interactions of that particular client device 102 with the control state 104 would not exist. Under these circumstances, the particular client device 102 may be eligible for assignment of the treatment state 106 but not the control state 104 due to the fact that data corresponding to interactions with the control state 104 may not correspond to a sufficient length of time to generate meaningful result data 202. In other implementations, the particular client device 102 may be assigned the control state 104, however, result data 202 corresponding to that client device 102 may be disregarded. In still other implementations, result data 202 corresponding to the interactions of that client device 102 during the experiment time period 110 may be used, however the result data 202 may be scaled or otherwise modified based on the difference between the length of time corresponding to the result data 202 and the length of time corresponding to interactions of other client devices 102 with the experiment states. As yet another example, user data 208 corresponding to a client device 102 having no preexisting interactions with a control state 104 may include a purchase history, a browsing history, a search history, and so forth, that may be indicative of user behaviors relevant to a statistical hypothesis experiment. At least a portion of that user data 208 may be used as result data 202.

Block 308 illustrates beginning the experiment, in which the experiment comprises the control state 104 and an experimental treatment state 106. Prior to the experiment start T1, the control state 104 may be presented to each client device 102 that accesses the user experience. Subsequent to the experiment start T1, experiment data 204 may be used to determine a manner in which experiment states may be assigned and presented to client devices 102. For example, the experiment data 204 may indicate that both the control state 104 is to be presented to fifty percent of the client devices 102 accessing the user experience, and the treatment state 106 is to be presented to the remaining fifty percent of the client devices 102. Other ratios or counts of client devices 102 to which each experiment state is assigned, such as a non-equal distribution among experiment states, may be used, depending on the parameters of the experiment. The experiment data 204 may also indicate one or more limitations regarding the assignment of experiment states to particular client devices 102 based on hardware, software, geographical location, user characteristics, and so forth.

Block 310(1) illustrates the first client device 102(1) accessing the user experience during the experiment time period 110. Block 310(2) illustrates the second client device 102(2) also accessing the user experience during the experiment time period 110. Accessing the user experience within the experiment time period 110 may trigger the assignment of one of the control state 104 or the treatment state 106 to each client device 102. The manner in which experiment states are assigned to client devices 102 may be determined based at least partially on the experiment data 204.

Block 312 illustrates the server(s) 108 presenting the control state 104 to the first client device 102(1) and the treatment state 106 to the second client device 102(2). The length of time over which metric values are collected for determination of result data 202 may be calculated from the time at which experiment states are first assigned to client devices 102. For example, the experiment data 204 may indicate that the experiment is intended to determine result data 202 corresponding to user interactions with an experiment state for sixty days. At least a portion of the result data 202 may be determined based on user interactions from the time that an experiment state is assigned until the experiment end T2. One or more of the experiment module 210 or the result determination module 212 may determine a difference between the total time (e.g., sixty days) indicated in the experiment data 204 and the time between assignment of the experiment state and the experiment end T2. Additional result data 202 may be determined based on user interactions corresponding to a period of time prior to or subsequent to the experiment time period 110. The length of the period of time to which the additional result data 202 corresponds may be determined based on the difference between the total time and the time between assignment of the experiment state and the experiment end T2. For example, if the time between assignment of an experiment state to a client device 102 and the experiment end T2 is fifteen days, additional result data 202 may be determined based on one or more periods of time prior to or subsequent to the experiment time period 110 having a length of forty-five days.

Block 314 illustrates generation of control data 120 by the first client device 102(1) corresponding to interactions with the control state 104. For example, the control data 120 may indicate a user's selection of a link, advertisement, or product, a user's purchase of a product or service, a user's initiation of a trial subscription for a service, and so forth, subsequent to presentation of the control state 104 to the first client device 102(1). The interactions with the control state 104 may occur at any time subsequent to assignment of the control state 118 and the experiment end T2. The control data 120 may include an indication of the specific day or time at which one or more of the user interactions occurred.

Block 316 illustrates generation of first treatment data 114(1) by the second client device 102(2) corresponding to interactions with the treatment state 106 prior to the experiment end T2. The first treatment data 114(1) may also indicate a user's selection of a link, advertisement, or product, a user's purchase of a product or service, a user's initiation of a trial subscription for a service, and so forth, subsequent to presentation of the treatment state 106 to the second client device 102(2). The interactions with the treatment state 106 to generate the first treatment data 114(1) may occur at any time subsequent to assignment of the treatment state 112 and the experiment end T2. The first treatment data 114(1) may include an indication of the specific day or time at which one or more of the user interactions occurred.

Block 318 illustrates ending the experiment and beginning presentation of a single experiment state to client devices 102. At the conclusion of the experiment time period 110 (e.g., the experiment end T2), an individual conducting the experiment may determine at least a portion of the result data 202 based on one or more of the control data 120, the user data 208, or the first treatment data 114(1). For example, the portion of the result data 202 may include one or more metric values indicating favorable responses to one or more features of the treatment state 106. Responsive to this information, the individual conducting the experiment may cease providing the control state 104 to client devices 102 and provide the treatment state 106 to each subsequent client device 102 that accesses the user experience. Subsequent to the experiment end T2, no further user interactions with the control state 104 would occur because the control state 104 would no longer be presented to the client devices 102. In other implementations, the result data 202 may indicate unfavorable responses to one or more features of the treatment state 106, and the individual conducting the experiment may cease providing the treatment state 106 to client devices 102 and provide the preexisting control state 104 to each subsequent client device 102. Client devices 102 to which the treatment state 106 was assigned may continue to access the treatment state 106 to enable generation of additional treatment data 114.

Block 320 illustrates generation of second treatment data 114(2), by the second client device 102(2), corresponding to interactions with the treatment state 106 subsequent to the experiment end T2. As described previously, the experiment data 204 may indicate that the experiment is intended to determine result data 202 corresponding to user interactions with an experiment state for a selected length of time, such as sixty days. In some implementations, the experiment time period 110 may be shorter than the selected length of time. Therefore, the first treatment data 114(1) may not correspond to a period of time equal to the selected length of time. The second client device 102(2) may continue to access the treatment state 106 for a period of time (e.g., the second treatment period 116(2)) subsequent to the experiment end T2. The sum of the periods of time that correspond to the first treatment data 114(1) and to the second treatment data 114(2) may equal the selected length of time indicated in the experiment data 204.

Block 322 illustrates determination of result data 202 corresponding to the control state 104 based on the control data 120 and the user data 208 associated with the first client device 102(1). As described previously, the experiment data 204 may indicate that the experiment is intended to determine result data 202 corresponding to user interactions with an experiment state for a selected length of time. The experiment time period 110 may be shorter than the selected length of time. Therefore, the control data 120 may not correspond to a period of time equal to the selected length of time. In some implementations, the control state 104 may no longer be accessible subsequent to the experiment end T2. For example, an individual conducting the experiment may elect to present the treatment state 106 to each client device 102 accessing the user experience after the end of the experiment time period 110. The user data 208 may include data (e.g., second control data 120(2)) indicative of user interactions with the control state 104 that occurred prior to assignment of the control state 118, and in some implementations, prior to the experiment start T1. The sum of the periods of time that correspond to the user data 208 and the control data 120 may equal the selected length of time indicated in the experiment data 204. For example, the experiment may be configured to determine result data 202 corresponding to a time period of sixty days. The length of time between assignment of the control state 118 and the experiment end T2 may be less than sixty days. The user data 208 may be used to determine result data 202 for a time period equal to the difference between sixty days and the length of time between assignment of the control state 118 and the experiment end T2. In some implementations, a variation between user responses to a control state 104 prior the experiment start T1 and user responses to the control state 104 after the experiment start T1 may be determined. Result data 202 corresponding to the control state 104 may be modified to account for such variations.

Block 324 illustrates determination of result data 202 corresponding to the treatment state 106 based on the first treatment data 114(1) and the second treatment data 114(2) associated with the second client device 102(2). The result data 202 corresponding to the treatment state 106 and the result data 202 corresponding to the control state 104 may be used to determine a difference between one or more metric values associated with each experiment state. For example, a graph 214 or another type of output indicating metric values associated with one or more of the control state 104, the treatment state 106, or differences between values of the control state 104 and treatment state 106 may be generated and provided to an individual conducting the experiment.

Figure 4:
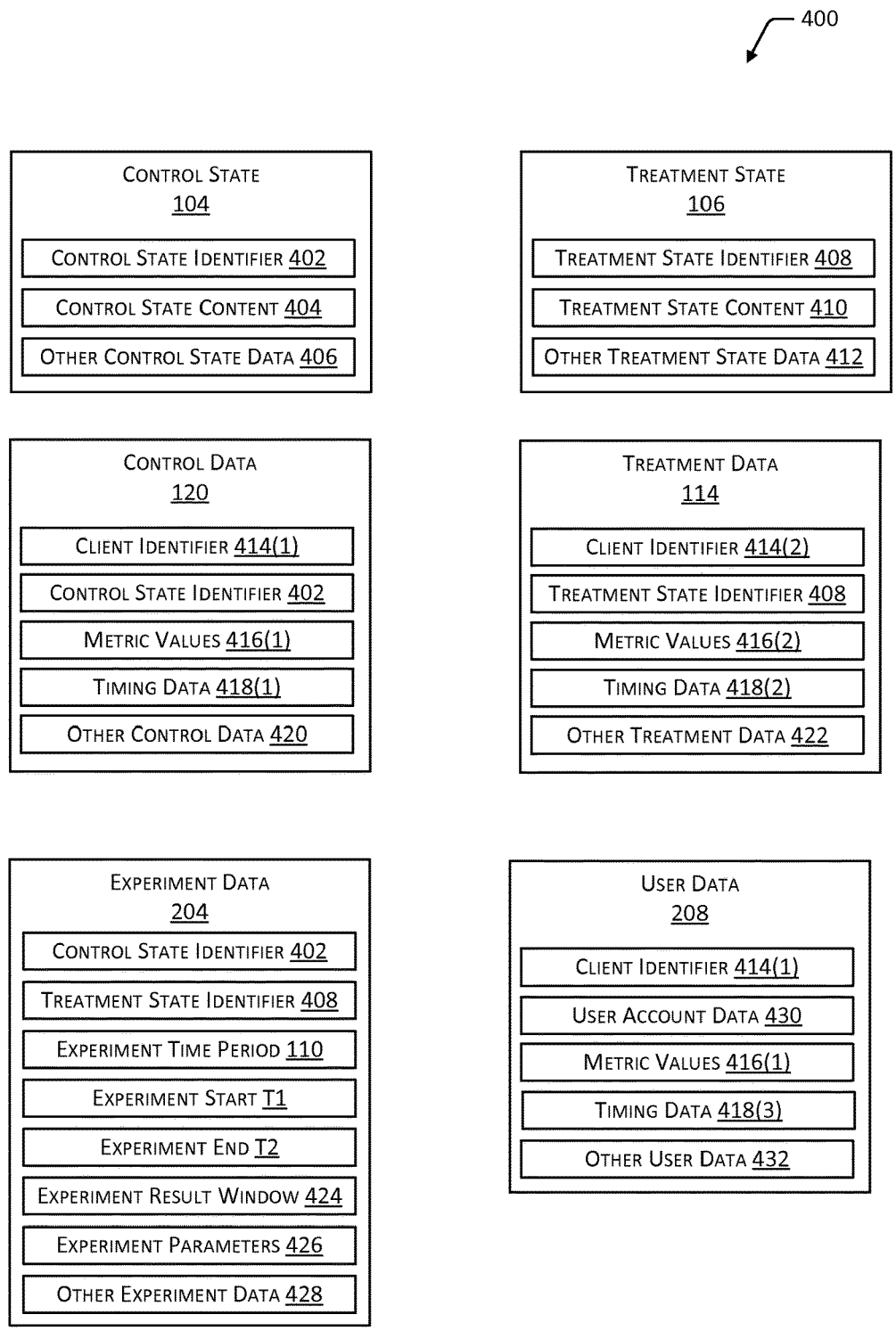
FIG. 4 is a block diagram illustrating examples of control states, treatment states, control data, treatment data, experiment data, and user data.

FIG. 4 is a block diagram 400 illustrating examples of control states 104, treatment states 106, control data 120, treatment data 114, experiment data 204, and user data 208.

A control state 104 may include a control state identifier 402, control state content 404, and other control state data 406. A treatment state 106 may include a treatment state identifier 408, treatment state content 410, and other treatment state data 412. A state identifier may be unique to the respective experiment state to which it is associated and may include any manner of data, including an alphanumeric string, image data, video data, audio data, and so forth. For example, a control state identifier 402 may include a name or other characteristic of the control state 104 provided by an individual conducting the experiment. Similarly, a treatment state identifier 408 may include a name or other characteristic of the treatment state 106. In some implementations, a state identifier may include a unique identifier recognizable by a computing device, which is not necessarily recognizable by a user. State identifiers may be used as indicators of an experiment state that is assigned to and executed by one or more client devices 102. For example, storage of a state identifier in the data store 206 or in association with one or more client devices 102 as an indication of an experiment state may reduce or eliminate the need to provide and store experiment states themselves when providing or receiving experiment data 204, user data 208, control data 120, or treatment data 114.

The state content associated with an experiment state may include any manner of visible, audible, or tactile content perceivable by a user as part of a user experience. For example, control state content 404 may include the type or arrangement of text, images, videos, audio elements, vibration, and so forth, associated with a website, an application, or any other manner of user experience presented to one or more users via a client device 102. The treatment state content 410 may similarly include visible, audible, or tactile elements associated with a user experience. Generally, at least a portion of the control state content 404 may differ from the treatment state content 410, such that variations in user responses to both the control state 104 and the treatment state 106 may be determined. The control state 104 and the treatment state 106 may differ by variation of a single feature or multiple features.

The other control state data 406 may include elements used to modify the output of the control state content 404 based on the nature of a client device 102 and the capabilities thereof, a timestamp indicating the date or time at which control state content 404 was assigned to a client device 102, times when the control state content 404 was presented, and so forth. The other treatment state data 412 may similarly include elements for modifying treatment state content 410 based on the nature of client devices 102, timestamps, presentation times, and so forth, associated with the treatment state 106.

The control data 120 may include data indicative of interactions by a user of a client device 102 with one or more features of the control state 104. The control data 120 may include a client identifier 414(1) associated with the client device 102 or the user of the client device 102 to which the control state 104 was presented. A client identifier 414(1) may include an identifier associated with a user, such as a user account identifier. For example, a user may provide user account information, which may include a user identifier, to access the user experience. In other implementations, client identifier 414(1) may include an identifier associated with a client device 102, such as an Internet Protocol (IP) or machine access control (MAC) address of a client device 102. The client identifier 414(1) may include data determined from the client device 102. For example, a purchase history, search history, browsing history, or other content stored in association with a client device 102 indicative of a user or the client device 102 may be used to determine the identity of the user or the client device 102. In some implementations, the client identifier 414(1) may include an identifier associated with interactions between the client device 102 and the user experience, such as a session identifier.

The control data 120 may also include the control state identifier 402, which may be used to determine that the control data 120 is associated with a client device 102 to which the control state 104 has been assigned. The control state identifier 402 may be used to differentiate control data 120 received by the server(s) 108 from treatment data 114.

The control data 120 may further include one or more metric values 416(1). The metric values 416(1) may be indicative of one or more user interactions with one or more features of the control state 104. Example metrics may include whether a user selected a link, advertisement, or product, initiated a trial subscription for a service, or purchased a product during the experiment time period 110. Metrics may also include whether the user returned the product, purchased additional products, or initiated a paid subscription for the service subsequent to the experiment time period 110. The metric values 416(1) may indicate a count of instances that a client device 102 accessed or interacted with a particular feature, a length of time a client device 102 viewed or otherwise interacted with a feature, and so forth.

The control data 120 may also include timing data 418(1). Timing data 418(1) may include timestamps or other data indicating the days or times at which particular user interactions occurred. The control data 120 may associate one or more user responses or metric values 416(1) with the particular days on which the user responses occurred. Continuing the example, the control data 120 may associate a first metric value 416(1) or set of metric values 416(1) with timing data 418(1) indicative of the first day after assignment of the control state 118, a second metric value 416(1) with the second day, a third metric value 416(1) with the third day, and so forth.

Other control data 420 may include information regarding features of the client devices 102 to which the control state 104 was assigned, a version identifier associated with the control state 104, data indicative of other activities of the client devices 102 subsequent to a positive or negative response to the control state 104, and so forth.

The treatment data 114 may include data indicative of interactions by a user of a client device 102 with one or more features of the treatment state 106. The treatment data 114 may include a client identifier 414(2) which may be a similar type of identifier to the client identifier 414(1) associated with the control data 120. For example, the client identifier 414(2) may be associated with the client device 102 to which the treatment state 106 was assigned, a user of the client device 102, an interaction between the client device 102 and the server(s) 108, and so forth. Client identifiers 414 may include any manner of alphanumeric, audio, video, or machine-readable data that may be used to differentiate a particular client device 102 from other client devices 102.

The treatment data 114 may also include the treatment state identifier 408, which may be used to determine that the treatment data 114 is associated with a client device 102 to which the treatment state 106 has been assigned. The treatment state identifier 408 may be used to differentiate treatment data 114 received by the server(s) 108 from control data 120.

The treatment data 114 may further include one or more metric values 416(2), which may be indicative of one or more user interactions with one or more features of the treatment state 106. The particular metrics associated with the treatment data 114 may be identical to those associated with the control data 120. For example, the experiment may be configured to determine differences in a particular type of user interaction responsive to different features of the experiment states. The control data 120 may include a first set of metric values 416(1) corresponding to particular metrics of a user's interaction with the control state 104. The treatment data 114 may include a second set of metric values 416(2) corresponding to the same particular metrics but associated with a user's interaction with the treatment state 106.

The treatment data 114 may additionally include timing data 418(2), which may include timestamps or other data indicating the days or times at which particular user interactions occurred. For example, the treatment data 114 may associate one or more metric values 416(2) or user responses with the days or other time periods on which the user responses occurred.

Other treatment data 422 may include information regarding features of the client devices 102 to which the treatment state 106 was assigned, an identifier of version associated with the treatment state 106, data indicative of other activities of the client devices 102 subsequent to a positive or negative response to the treatment state 106, and so forth.

The experiment data 204 may include data indicative of one or more parameters of a statistical hypothesis experiment or other type of experiment, such as a Bayesian interference test. The experiment data 204 may include the control state identifier 402 and the treatment state identifier 408, which may indicate the experiment states to be assigned, presented, and tested during the experimental process. In other implementations, experiment states other than a control state 104 and a treatment state 106 may be tested. For example, two different treatment states 106 may be assigned in the absence of a control state 104. As another example, two different versions of a control state 104 may be tested. In still other implementations, more than two experiment states may be tested. For example, a control state and two treatment states may be each be assigned to one third of the client devices 102 accessing a user experience.

The experiment data 204 may also include the experiment time period 110, which may include a length of time (e.g., thirty days). The experiment data 204 may also include one or more of the experiment start T1 or the experiment end T2. For example, the experiment data 204 may include one or more of a specific day or time on which the experiment will be initiated, a day or time on which the experiment will end, or a length of time corresponding to the experiment time period 110. One or more of the experiment start T2, the experiment end T2, or the experiment time period 110 may be input by an individual conducting the experiment.

The experiment data 204 may further include an experiment result window 424. The experiment result window 424 may include a length of a time period from which result data 202 may be determined. For example, the experiment data 204 may indicate that the experiment is intended to determine result data 202 corresponding to user interactions with an experiment state for sixty days. The experiment result window 424 may be used to determine the length of the second control period 122(2) and the second treatment period 116(2). For example, if the experiment time period 110 is shorter than the experiment result window 424, result data 202 corresponding to one or more time periods prior to the experiment start T1 or subsequent to the experiment end T2 may be determined. The length of one or more of the second control period 122(2) or the second treatment period 116(2) may be based at least partially on the difference between the experiment result window 424 and the length of time between assignment of an experiment state and the experiment end T2.

The experiment data 204 may additionally include one or more experiment parameters 426. Experiment parameters 426 may include the manner in which experiment states may be assigned to client devices 102. For example, the experiment parameters 426 may include a ratio, percentage, or count of devices corresponding to the allocation of experiment states to client devices 102 that access the user experience during the experiment time period 110. Experiment parameters 426 may also include limitations regarding geographic or demographic characteristics of users or client devices 102 to which particular experiment states are assigned. For example, assignment of the treatment state 106 may be limited to client devices 102 located in a particular state. As another example, assignment of a treatment state 106 may be limited to users that have previously purchased a particular product. Experiment parameters 426 may further include limitations regarding particular types of client devices 102. For example, presentation of particular experiment states may be limited based on hardware or software associated with one or more client devices 102.

Other experiment data 428 may include data indicative of the earliest presentation of the control state 104 to a client device 102 (e.g., the time indicative of prior presentation of the control state T0) or a time indicative of an end of the treatment window T3 after which determination of result data 202 may cease. Other experiment data 428 may also include identifiers or characteristics associated with one or more experimenter devices 216, types of output that may be accessible or inaccessible to the experimenter device(s) 216, and so forth.

User data 208 may include data indicative of one or more characteristics of client devices 102 or users of client devices 102. User data 208 may also include one or more interactions of client devices 102 with an experiment state. The user data 208 may include the client identifier 414(1) indicative of the client device 102 or user to which the user data 208 corresponds.

The user data 208 may also include user account data 430. User account data 430 may include one or more geographic or demographic characteristics associated with a client device 102 or with a user of the client device 102. For example, user account data 430 may include one or more of a user name, password, account number, date of birth, residence address, employment address, sex, marital status, purchase history, search history, browsing history, and so forth. User account data 430 may also include data regarding a client device 102, such as an IP or MAC address, specific hardware or other features of the client device 102, software or applications executed by the client device 102, a current or past operational status of the client device 102, and so forth. The user account data 430 may be used to determine whether any experiment parameters 426 may affect assignment of an experiment state to a client device 102. The user account data 430 may also be used to generate result data 202 corresponding to a particular subset of users. For example, result data 202 for a large body of users may be determined, while a graph 214 or other output may be generated using only a portion of the result data 202, such as the result data 202 corresponding to users that reside in a particular geographic region.

The user data 208 may further include metric values 416(1) and timing data 418(3) associated with user interactions responsive to the control state 104. For example, the user data 208 may include user interactions associated with a preexisting control state 104 prior to the start of an experiment or assignment of the control state 104 to the client device 102. Continuing the example, a purchase history, search history, or browsing history may include data indicative of a user's selection of a link, advertisement, or product; a user's purchase of a product or service; a user's initiation of a trial subscription for a service; a user's return of a product; a user's initiation of a paid subscription for a service; and so forth. The user data 208 may be used, in combination with control data 120 determined during the experiment time period 110, to generate result data 202 corresponding to a control state 104.

Other user data 432 may include additional identifiers of other client devices 102 associated with a user, identifiers associated with other users that may be affiliated with a particular user or client device 102 (e.g., family members), and so forth.

Figure 5:
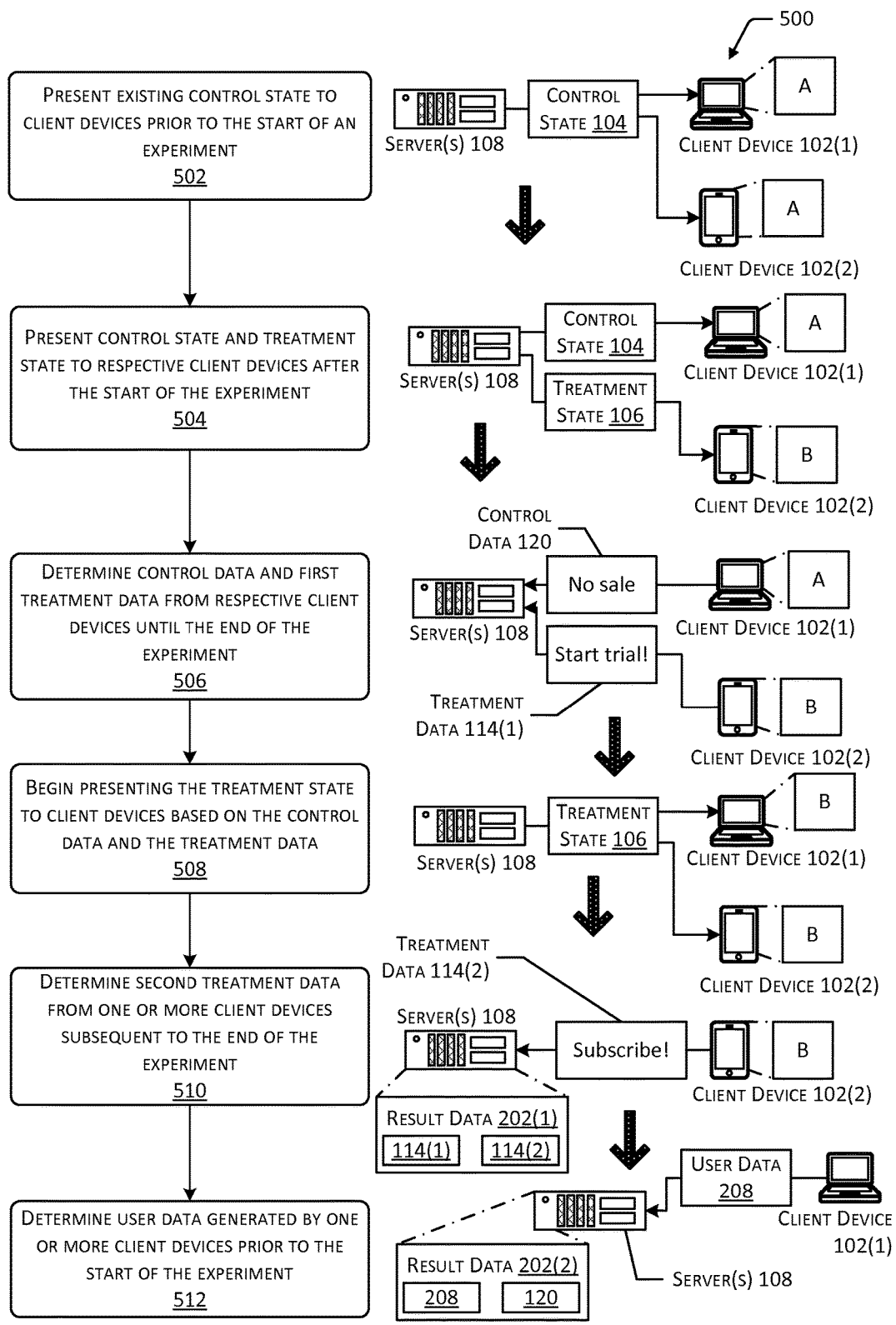
FIG. 5 illustrates a method for determining control data, treatment data, and user data from client devices associated with an experiment.

FIG. 5 illustrates a method 500 for determining control data 120, treatment data 114, and user data 208 from client devices 102 associated with an experiment.

At 502, an existing control state 104 may be presented to one or more client devices 102 prior to the start of an experiment. For example, one or more servers 108, experimenter devices 216, or other computing devices may provide the control state 104 to one or more client devices 102 accessing a user experience. In some implementations, the control state 104 may be stored in association with the client devices 102 for access. FIG. 5 depicts a first client device 102(1) and a second client device 102(2) providing the control state 104 for interaction by a user.

At 504, the control state 104 and a treatment state 106 may be presented to respective client devices 102 after the start of the experiment. An experiment module 120 may assign one or more of the control state 104 or the treatment state 106 to client devices 102 accessing the user experience based on experiment data 204. For example, the experiment data 204 may indicate that both the control state 104 and the treatment state 106 are to be assigned to fifty percent of the client devices 102. Each client device 102 that accesses the user experience during the experiment time period 110 may be assigned one of the control state 104 or the treatment state 106. FIG. 5 depicts the control state 104 presented to the first client device 102(1) and the treatment state 106 presented to the second client device 102(2).

At 506, control data 120 and treatment data 114 may be determined from respective client devices 102 until the end of the experiment. User interactions responsive to the control state 104 during the experiment time period 110 may generate control data 120 indicative of positive or negative responses to one or more features of the control state 104. For example, a user associated with the first client device 102(1) may decline to purchase a product or service or may refrain from selecting a link, advertisement, or product. User interactions responsive to the treatment state 106 during the experiment time period 110 may generate first treatment data 114(1) indicative of user responses to one or more features of the treatment state 106. For example, a user associated with the second client device 102(2) may elect to begin a trial subscription for a service.

At 508, based at least partially on the control data 120 and the first treatment data 114(1), an individual conducting the experiment may begin presenting the treatment state 106 to the client devices 102 after the end of the experiment. For example, the control data 120 and the first treatment data 114(1) may indicate that during the experiment time period 110, user responses to the treatment state 106 yielded positive values for one or more metrics. Continuing the example, a greater number of users to which the treatment state 106 was presented may have elected to begin a trial subscription for a service when compared to the users to which the control state 104 was presented. Subsequent to the experiment end T2, the treatment state 106 may be presented to each client device 102 accessing the user experience, and the control state 104 may no longer be presented.

At 510, second treatment data 114(2) may be determined from one or more client devices 102 subsequent to the end of the experiment. For example, the second client device 102(2) and other client devices 102 to which the treatment state 106 was assigned may continue to present the treatment state 106 to users. Users of the client devices 102 may continue to interact with the treatment state 106 to generate second treatment data 114(2). For example, the second treatment data 114(2) may indicate whether users to whom the treatment state 106 was presented elected to initiate a paid subscription for a service.

Result data 202(1) corresponding to the treatment state 106 may be determined based on the first treatment data 114(1) and the second treatment data 114(2). For example, the first treatment data 114(1) may indicate a large number of users that elected to initiate a trial subscription for a service or purchase a product. The number of users that responded positively to the treatment state 106 may exceed the number that responded positively to the control state 104. Based on the first treatment data 114(1), the treatment state 106 may appear to generate an initial positive effect on conversions, revenue, or other metrics. However, the second treatment data 114(2), determined subsequent to the end of the experiment, may indicate that a significant number of users refrained from initiating a paid subscription, returned a purchased product, or spent a smaller quantity of currency over an extended period of time, despite the initial positive effect of the treatment state 106. Alternatively, the second treatment data 114(2) may indicate a prolonged positive effect of the treatment state 106. For example, the second treatment data 114(2) may indicate that the initial positive effect determined from the first treatment data 114(1) continued or increased over an extended period of time.

At 512, user data 208 generated by one or more client devices 102 prior to the start of the experiment may be determined. Because the control state 104 may no longer be presented to client devices 102 subsequent to the end of the experiment, the long-term effect of the control state 104 on one or more metrics may not be determined using data generated subsequent to the experiment end T2. However, because the control state 104 was presented to one or more client devices 102 prior to the start of the experiment, user data 208 indicative of user interactions that occurred prior to the experiment time period 110 may be accessed to generate result data 202(2) associated with the control state 104. For example, the first client device 102(1) to which the control state 104 was assigned may generate user data 208 prior to the experiment time period 110. After assignment of the control state 104 to the first client device 102(1), the first client device 102(1) may generate control data 120 indicative of user interactions prior to the end of the experiment.

Figure 6:
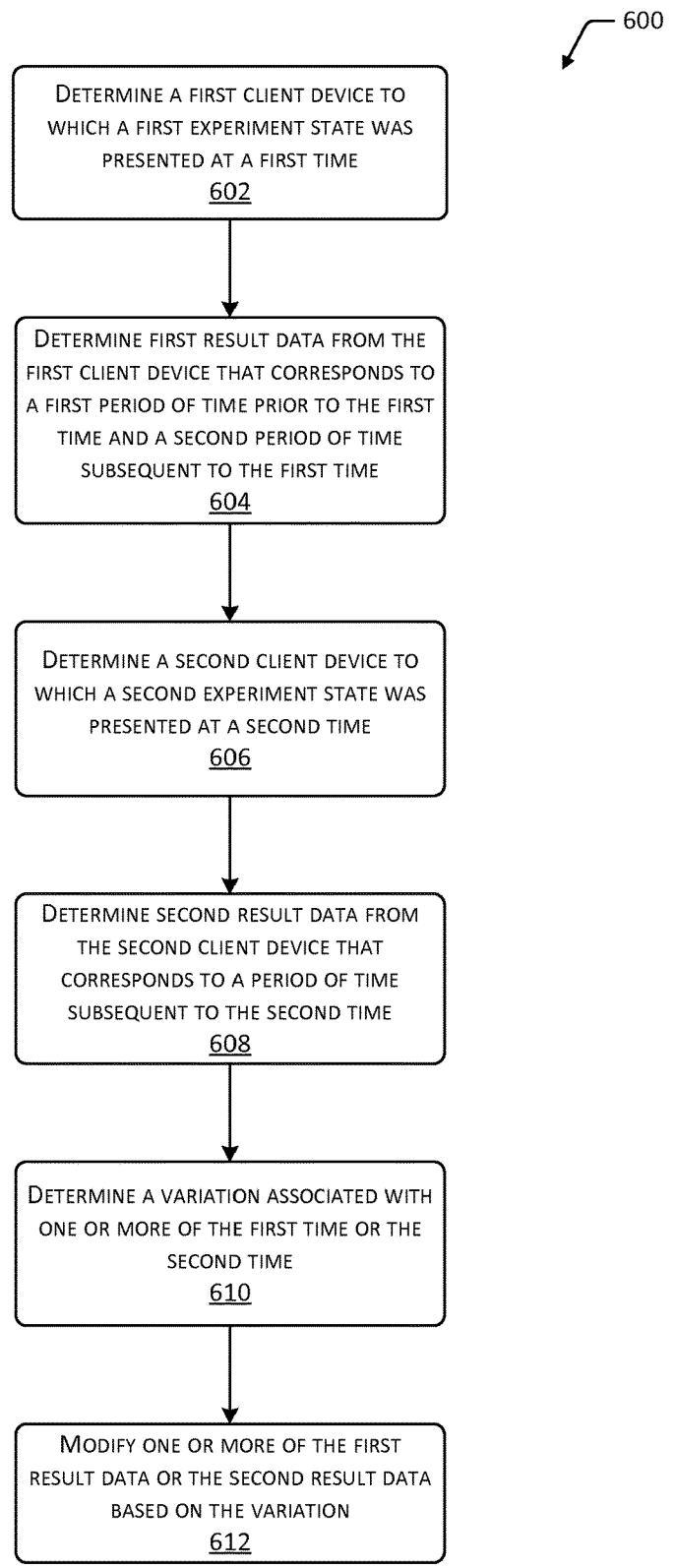
FIG. 6 is a flow diagram illustrating a method for determining result data from client devices.

FIG. 6 is a flow diagram 600 illustrating a method for determining result data 202 from client devices 102.

Block 602 determines a first client device 102(1) to which a first experiment state was presented at a first time. For example, a control state 104 may be presented to a first client device 102(1) prior to the start of a statistical hypothesis experiment. In other implementations, an experiment may be configured to test two treatment states 106. In still other implementations, result data 202 corresponding to different experiment states may be determined without determining an experiment time period 110. For example, experiment states may be assigned to respective client devices 102 independent of the start or the end of an experiment.

Block 604 determines first result data 202(1) from the first client device 102(1) that corresponds to a first period of time prior to the first time and to a second period of time subsequent to the first time. For example, an experiment state may be presented to the first client device 102(1) prior to the presentation of the first experiment state indicated in block 602, such as during routine use of the first client device 102(1) unrelated to the generation of result data 202. User data 208 corresponding to the user's interactions prior to the first time may be used to generate at least a portion of the first result data 202(1). Subsequent to the presentation of the first experiment state indicated in block 602, user interactions responsive to the first experiment state may also generate at least a portion of the first result data 202(1).

Block 606 determines a second client device 102(2) to which a second experiment state was presented at a second time. For example, a treatment state 106 may be presented to a second client device 102(2) subsequent to the start of a statistical hypothesis experiment. In other implementations, the experiment may be configured to test two treatment states 106, and block 606 may present a second treatment state 106 to the second client device 102(2) while a first treatment state 106 is presented to the first client device 102(1). In still other implementations, presentation of the second experiment state to the second client device 102(2) may occur without determining an experiment time period 110, independent of the start or the end of an experiment. For example, a preexisting control state 104 or a first treatment state 106 may be presented to client devices 102 for a first period of time. Subsequent to the first period of time, presentation of the control state 104 or first treatment state 106 may be discontinued, and a different treatment state 106 may be provided to client devices 102. Result data 202 corresponding to the first period of time may be used to determine metric values associated with the control state 104 or first treatment state 106. Result data 202 corresponding to a time period subsequent to the first period of time may be used to determine metric values associated with the different treatment state 106.

Block 608 determines second result data 202(2) from the second client device 102(2) that corresponds to a period of time subsequent to the second time. For example, user interactions responsive to the second experiment state may occur after presentation of the second experiment state to the second client device 102(2), and in some implementations, after the end of an experiment time period 110.

Block 610 determines a variation associated with one or more of the first time or the second time. As described previously, time data 218 may indicate one or more time periods that include holidays, weekends, event launches for a particular product, special events, natural disasters, inclement weather, or other factors that may affect result data 202 determined from user interactions during those time periods. Based on time data 218 corresponding to the time periods from which the first result data 202(1) was determined and time periods from which the second result data 202(2) was determined, variations in one or more metric values may be determined.

Based on the determined variations, block 612 modifies one or more of the first result data 202(1) or the second result data 202(2) to mitigate the effect of any factors specific to a particular time period that may have impacted the result data 202. For example, the time data 218 may indicate that a special event featuring a competing product may have decreased sales of a product advertised using an experiment state, during the time that the experiment state was presented to a client device 102. Based on the time data 218, one or more metric values 416 corresponding to the experiment date may be modified (e.g., increased) to account for the effect indicated in the time data 218.

Figure 7:
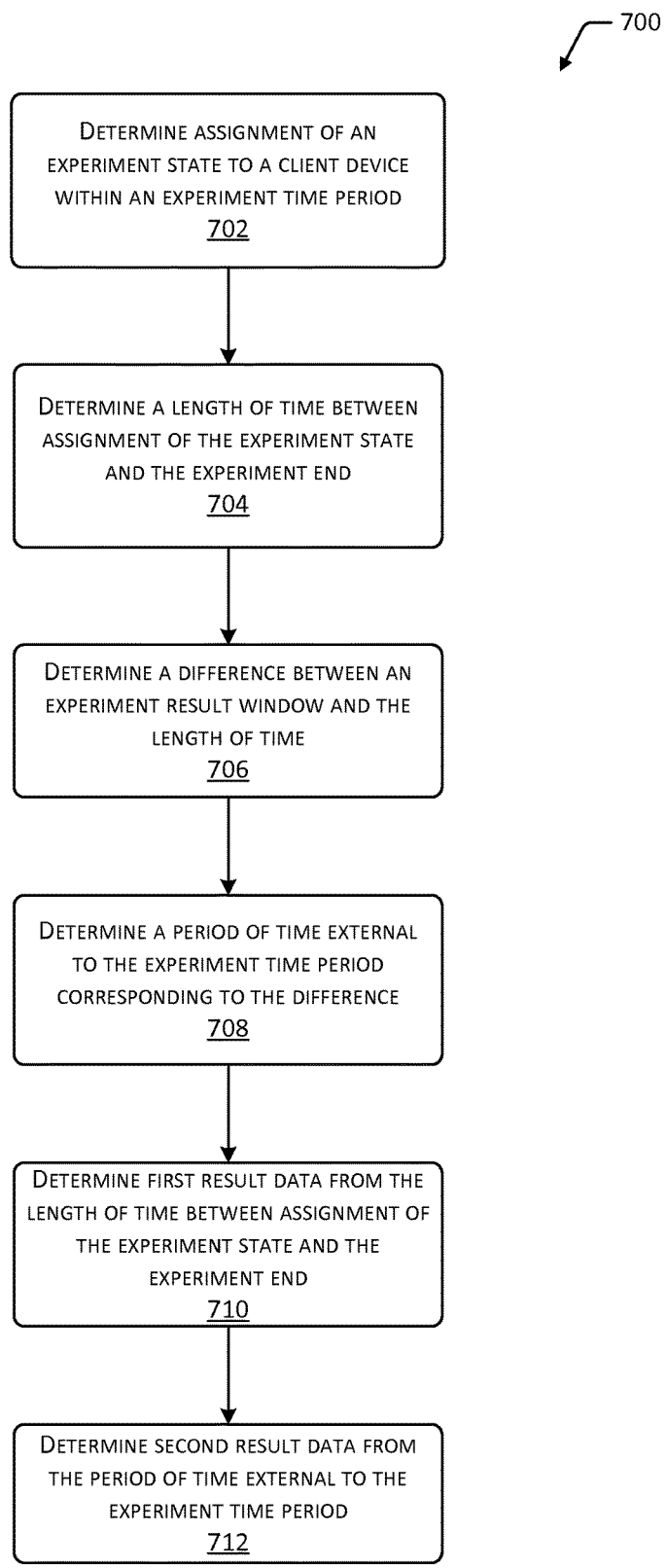
FIG. 7 is a flow diagram illustrating a method for determining result data corresponding to time periods external to an experiment time period.

FIG. 7 is a flow diagram 700 illustrating a method for determining result data 202 corresponding to time periods external to an experiment time period 110.

Block 702 determines assignment of an experiment state to a client device 102 within an experiment time period 110. Client devices 102 that access a user experience during an experiment time period 110 may be presented with an experiment state. The manner in which experiment states are assigned, the length of the experiment time period 110, the specific day or time of the experiment start T1 and the experiment end T2, and so forth, may be determined based on experiment data 204.

Block 704 determines a length of time between assignment of the first experiment state and the experiment end T2. For example, an experiment time period 110 may have a length of thirty days. A client device 102 that accesses a user experience on the first day of the experiment time period 110 may interact with the experiment state for thirty days prior to the experiment end T2. A client device 102 that accesses the user experience on the final day of the experiment time period 110 may interact with the experiment state for one day prior to the experiment end T2.

Block 706 determines a difference between an experiment result window 424 and the length of time between assignment of the experiment state and the experiment end T2. For example, experiment data 204 corresponding to the experiment may indicate an experiment result window 424 having a length of sixty days and an experiment time period 110 having a length of thirty days. Depending on the day within the experiment time period 110 at which a client device 102 accesses the user experience, the length of time until the experiment end T2 may range from one day to thirty days. Therefore, the difference between the experiment result window 424 and the length of time until the experiment end T2 may range from thirty days to fifty-nine days.

Block 708 determines a period of time external to the experiment time period 110 that corresponds to the difference between the experiment result window 424 and the length of time between assignment of the experiment state and the experiment end T2. In some implementations, a client device 102 may continue to present an experiment state subsequent to the experiment end T2. User interactions responsive to the experiment state subsequent to the experiment end T2 may be used to generate result data 202. In other implementations, an experiment state may have been presented to a client device 102 prior to the start of the experiment time period 110. User interactions responsive to the experiment state prior to the experiment start T1 may be accessed and used to generate result data 202.

Block 710 determines first result data 202(1) from the length of time between assignment of the experiment state and the experiment end T2. After assignment and presentation of an experiment state to a client device 102 during the experiment time period 110, a user may interact with the experiment state until the experiment end T2. User interactions responsive to the experiment state may be used to generate result data 202(1). However, the length of time between assignment of the experiment state and the experiment end T2 may be less than the length of the experiment result window 424. For example, the experiment result window 424 may have a length of sixty days, while the experiment time period 110 may be thirty days in length. A client device 102 that first accesses an experiment state on the fifteenth day of the experiment time period 110 may only interact with the experiment state for fifteen days prior to the experiment end T2.

Block 712 determines second result data 202(2) from the determined period of time external (e.g., prior to or subsequent to) the experiment time period 110. For example, the second result data 202(2) may be determined from user interactions that occurred prior to the start of the experiment or subsequent to the end of the experiment. In some implementations, the second result data 202(2) may be determined from user interactions that occurred during multiple time periods external to the experiment time period 110. The combined length of the time period(s) external to the experiment time period 110 and the time between assignment of the experiment state and the experiment end T2 may be equal to the length of the experiment result window 424. For example, user data 208 indicative of forty-five days of previous interactions of a client device 102 with an experiment state may be used in combination with data indicative of fifteen days of interactions during the experiment time period 110 to generate result data 202 that corresponds to an experiment result window 424 of sixty days.

Result data 202 may be used to evaluate one or more long-term effects of an experiment state. One example of a method by which a long-term effect of a treatment state 106 may be evaluated is described using a series of equations below. A treatment state 106 affecting one or more features of a website may be presented to users during and subsequent to an experiment time period 110. The number of times within or subsequent to the experiment time period 110 that a user accesses the website and the days at which each instance of the user's access occurred may be stored as result data 202. The sum of metric values associated with a user may be expressed as:

$$s(t) = r(t)\eta(t) \quad \text{(Equation 1)}$$

In Equation 1, the sum of user accesses (or other metric values) may be expressed as s, a number of repeated accesses by the user may be expressed as r, and a mean value may be expressed as $\eta$. Time may be expressed as t. If a website is available for access to one or more users for an extended period of time, a number of repeated instances that the website is accessed may reach an equilibrium or steady state value, such as an asymptotic value, expressed as:

$$r(t) = a(1 - e^{-\lambda t}) \quad \text{(Equation 2)}$$

In Equation 2, a and $\lambda$ are positive values. The difference between the mean values for a treatment state 106 ($\mu_T$) and the mean values for a control state 104 ($\mu_C$) may be expressed as:

$$\mu_T - \mu_C = (a_T \eta_T - a_C \eta_C) + (a_C \eta_C e^{-\lambda_C t} - a_T \eta_T e^{-\lambda_T t}) \quad \text{(Equation 3)}$$

Based on Equation 3, the limit of $\mu_T - \mu_C$ as t approaches infinity may be expressed as:

$$\mu_T - \mu_C = (a_T \eta_T - a_C \eta_C) \quad \text{(Equation 4)}$$

In cases where $a_T = a_C$, Equation 4 may be reduced to:

$$\mu_T - \mu_C = a(\eta_T - \eta_C) \quad \text{(Equation 5)}$$

Figure 8:
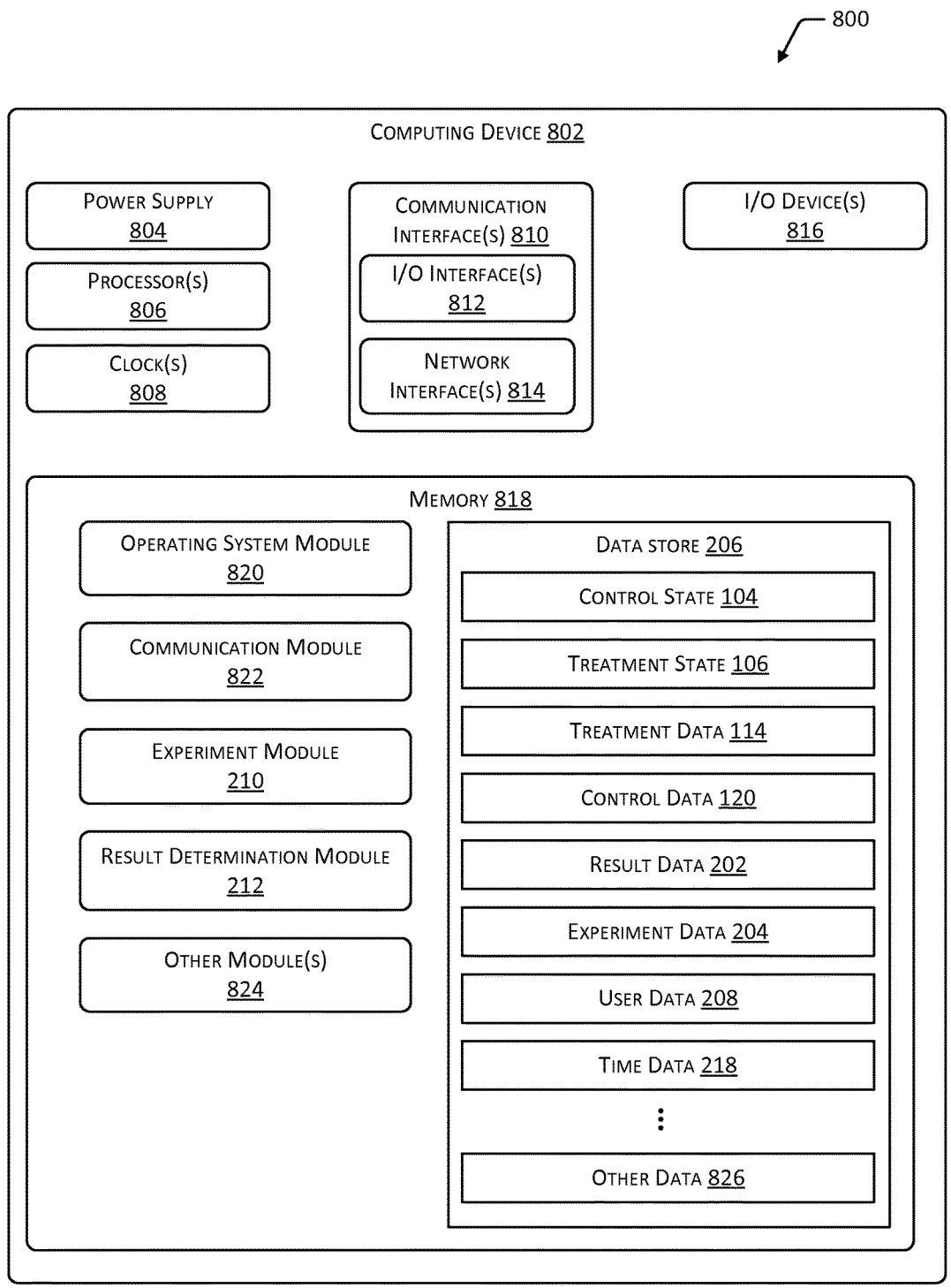
FIG. 8 is a block diagram illustrating a computing device within the scope of the present disclosure.

FIG. 8 is a block diagram 800 illustrating a computing device 802 within the scope of the present disclosure. The computing device 802 may include one or more client devices 102, servers 108, experimenter devices 216, or other computing devices 802 in communication with one or more of the client devices 102, servers 108, or experimenter devices 216.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clocks 808 may provide information indicative of date, time, ticks, and so forth. For example, the processor(s) 806 may use data from the clock 808 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input device or output device associated with a client device 102, server 108, or other computing device 802. For example, I/O devices 816 may include input devices, such as touch sensors, keyboards, mouse devices, microphones, and so forth. I/O devices 816 may also include output devices, such as speakers, displays, and so forth. In some implementations, the I/O devices 816 may be physically incorporated with the computing device 802 or may be externally placed.

The network interfaces 814 may be configured to provide communications between the computing device 802 and other devices, such as the I/O devices 816, routers, access points, and so forth. The network interfaces 814 may include devices configured to couple to one or more networks including local area networks (LANs), wireless LANs, wide area networks (WANs), wireless WANs, and so forth. For example, the network interfaces 814 may include devices compatible with Ethernet, Wi-Fi™, Bluetooth®, ZigBee®, Z-Wave, 3G, 4G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 206 and one or more of the following modules may also be stored in the memory 818. The modules may be executed as foreground applications, background tasks, daemons, and so forth. The data store 206 may use a flat file, database, linked list, tree, executable code, script, or other data structure to store information. In some implementations, the data store 206 or a portion of the data store 206 may be distributed across one or more other devices including other computing devices 802, network attached storage devices, and so forth.

A communication module 822 may be configured to establish communications with one or more other computing devices 802, such as client device 102, servers, experimenter devices 216, or other computing devices 802 in communication therewith. The communications may be authenticated, encrypted, and so forth.

The memory 818 may also store the experiment module 210. The experiment module 210 may access experiment data 204 to determine parameters associated with an experiment, such as the times at which an experiment may begin and end, the ratio at which each experiment state may be allocated among client devices 102, limitations regarding presentation of certain experiment states to certain client devices 102, and so forth. In some implementations, the experiment data 204 may include one or more geographic or demographic characteristics relating to client devices 102 or users that may affect the experiment states presented to particular client devices 102. The experiment module 210 may access user data 208 indicative of geographic or demographic characteristics of one or more users to determine assignment of the experiment states in a manner that corresponds to the experiment data 204. In other implementations, the experiment module 210 may determine the experiment result window 424 from the experiment data 204. The difference between the experiment result window 424 and the length of time between assignment of an experiment state and the end of the experiment may be used to determine the length of time periods external to the experiment time period 110 from which result data 202 may be generated.

The memory 818 may additionally store the result determination module 212. The result determination module 212 may determine one or more of control data 120, treatment data 114, or user data 208 from one or more client devices 102. The control data 120, treatment data 114, and user data 208 may be indicative of user interactions responsive to one or more experiment states. Based at least partially on the one or more of the treatment data 114, control data 120, or user data 208 determined from the client devices 102 or stored in the data store 206, the result determination module 212 may determine result data 202 that includes values corresponding to one or more metrics indicated in the experiment data 204. For example, the result data 202 may indicate a relationship between a number of client devices 102 to which a control state 104 was assigned that responded positively or negatively to a particular feature of the user experience. The result data 202 may also indicate a relationship between a number of client devices 102 to which a treatment state 106 was assigned that responded positively or negatively to a particular feature of the treatment state 106. The result data 202 may additionally include one or more variations between user interactions that were received responsive to the control state 104 and those that were received responsive to the treatment state 106. The experiment data 204 may include one or more threshold values that a variation between the control state 104 and the treatment state 106 may exceed to indicate statistical significance. For example, based on the experiment data 204, the result determination module 212 may disregard minor variations between user interactions received responsive to the control state 104 and the treatment state 106 as statistically insignificant if the variations are less than the threshold values.

The result determination module 212 may also generate output for presentation to an experimenter device 216 or other computing devices 802. For example, result data 202 may be used to generate a graph 214 associating one or more metric values associated with the control state 104, the treatment state 106, or the determined difference between the metric values of the control state 104 and the treatment state 106, with the time at which the metric values or difference was determined. For example, the result determination module 212 may determine the sum or average for a particular metric associated with the control state 104 on the first day that the control state 104 was presented to one or more client devices 102. The result determination module 212 may determine the sum or average of that metric associated with the treatment state 106 on the first day that the treatment state 106 was presented to one or more client devices 102. The result determination module 212 may further determine a difference between the metric value(s) associated with the control state 104 and those associated with the treatment state 106 on the first day the experiment states were presented to one or more of the client devices 102. This process may be repeated for the second day that experiment states were presented to respective client devices 102, the third day, and so forth. The graph 214 may therefore associate selected metric values with the days on which user responses that generated those metric values occurred.

Other modules 824 may also be present in the memory 818. For example, encryption modules may be used to encrypt and decrypt communications between computing devices 802. User interface modules may be used to receive and modify user data 208, time data 218, experiment data 204, and so forth.

Other data 826 in the data store 206 may include user input data regarding configurations, settings, or preferences. Other data 826 may also include threshold values corresponding to statistically significant metric values or differences between metric values for different experiment states. Other data 826 may further include criteria that may cause result data 202 determined from certain users or client devices 102 to be disregarded or to be weighted more heavily.

In different implementations, different computing devices 802 may have different capabilities or capacities. For example, a server 108 may have significantly more processor 806 capability and memory 818 capacity compared to the processor 806 capability and memory 818 capacity of a client device 102.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    at least a first user device;
    at least a second user device;
    a server comprising one or more memories storing computer-executable instructions and one or more hardware processors configured to execute the computer-executable instructions to:
        determine an experiment treatment time period for a statistical hypothesis test;
        present to the at least the first user device a control state for a first control period extending from subsequent to an experiment start time to an experiment end time of an experiment time period, the experiment time period being less than the experiment treatment time period;
        present to the at least the first user device the control state for a second control period, the second control period having at least a portion of the second control period beginning prior to the experiment start time and extending to the first control period;
        present to the at least the second user device a treatment state for a first treatment period beginning subsequent to a beginning of the first control period and extending to the experiment end time of the experiment time period;
        present to the at least the second user device the treatment state for a second treatment period beginning at the experiment end time, the second treatment period having a length equal to the difference between the experiment treatment time period and the first treatment period, and a total length of the first treatment period and the second treatment period is equal to a length of the first control period and the second control period;
        receive first control data from the first user device, wherein the first control data comprises at least one metric associated with the control state provided during the first control period;
        receive second control data from the first user device, wherein the second control data comprises the at least one metric associated with the control state provided during the second control period;
        receive first treatment data from the second user device, wherein the first treatment data comprises at least one metric associated with the treatment state during the first treatment period;
        receive second treatment data from the second user device, wherein the second treatment data comprises the at least one metric associated with the treatment state during the second treatment period;
        determine result data based at least partially on the first control data, the second control data, the first treatment data, and the second treatment data;
        process the result data to determine an effect of the treatment state during the first treatment period and the second treatment period corresponding to the statistical hypothesis test;
        generate a graph reflecting the effect of the treatment state based on the one or more metric values associated with one or more of the control state, the treatment state, or the determined difference between the control state and the treatment state; and
        present, at the server, the graph reflecting the effect of the treatment state, the graph providing an indication of whether to implement the treatment state.

2. The system of claim 1, further comprising computer-executable instructions to:
    determine time data corresponding to one or more of the first control period or the second control period, wherein the time data is indicative of a variation of the at least one metric associated with the one or more of the first control period or the second control period; and
    modify one or more of the second control data or the second treatment data based at least partially on the variation of the at least one metric.

3. The system of claim 1, wherein the computer-executable instructions to determine the result data further comprise computer-executable instructions to:
    determine a count of days associated with the first control data and the second control data;
    determine first values for the at least one metric corresponding to at least a portion of the count of days;

generate a first graph associating the first values for the at least one metric with the at least a portion of the count of days;

determine the count of days associated with the first treatment data and the second treatment data;

determine second values for the at least one metric corresponding to the at least a portion of the count of days; and generate a second graph associating the second values for the at least one metric with the at least a portion of the count of days.

4. The system of claim 1, further comprising computer-executable instructions to:

determine the long-term effect of the treatment state based at least partially on the first treatment data and the second treatment data, wherein the long-term effect is indicative of one or more of a rate of change of the at least one metric or a steady state of the at least one metric external to the experiment time period.

5. A method comprising:

determining, by a test server, an experiment treatment time period for a statistical hypothesis test;

presenting, by the test server to a first user device, a first feature of a user experience during a first control period;

receiving, by the test server, first result data from the first user device, wherein the first result data comprises at least one metric associated with the first feature, and wherein at least a portion of the first result data corresponds to a second control period prior to the first time period;

presenting, by the test server to a second user device, a second feature of the user experience during a first treatment period;

receiving, by the test server, second result data from the second user device, wherein the second result data comprises the at least one metric associated with the second feature, and wherein at least a portion of the second result data corresponds to a second treatment period subsequent to the first treatment period, the first treatment period and the second treatment period equal in length to the experiment treatment time period, and a total length of the first treatment period and the second treatment period is equal to a length of the first control period and the second control period;

processing, by the test server, the first result data and the second result data to generate metric data indicative of an effect of the second feature during the first treatment period and the second treatment period corresponding to the statistical hypothesis test;

generate, by the test server, a graph reflecting the effect of the second feature based on the one or more metric data associated with one or more of the first treatment period and the second treatment period, or the first control period and the second control period; and presenting, by the test server, the graph reflecting the effect second feature, the graph providing an indication of whether to implement the second feature.

6. The method of claim 5, further comprising:

wherein the first result data further corresponds to the second control period subsequent to the first control period, and wherein a sum of the first control period and the second control period corresponds to the length of time associated with the effect of one or more of the first feature or the second feature.

7. The method of claim 5, further comprising:

determining a difference between the at least one metric associated with the first feature and the at least one metric associated with the second feature at a plurality of times;

the generating the graph further associating the plurality of times with one or more of:

values of the at least one metric associated with the first feature;

values of the at least one metric associated with the second feature; or values of the difference between the at least one metric associated with the first feature and the at least one metric associated with the second feature; and displaying the graph including one or more of the first result data, or the second result data.

8. The method of claim 5, further comprising:

determining first time data corresponding to the first control period;

determining second time data corresponding to the first treatment period;

determining a difference between the first time data and the second time data, wherein the difference is indicative of a variation in the at least one metric; and modifying one or more of the first result data or the second result data based at least partially on the variation in the at least one metric.

9. The method of claim 5, further comprising:

determining an experiment time period associated with the statistical hypothesis test including the first feature and the second feature, and wherein at least a subset of the first result data corresponds to the second control period prior to the experiment time period.

10. The method of claim 5, further comprising:

determining an experiment time period associated with the statistical hypothesis test including the first feature and the second feature, and wherein at least a subset of the second result data corresponds to the second treatment period subsequent to the experiment time period.

11. The method of claim 5, further comprising:

determining an effect of the one or more of the first feature or the second feature based at least partially on one or more of the first result data or the second result data, wherein the effect is indicative of one or more of a rate of change of the at least one metric or a steady state of the at least one metric; and the generating the graph including one or more of the first result data or the second result data, wherein the one or more of the first result data or the second result data is indicative of the effect.

12. The method of claim 5, further comprising:

determining an experiment time period associated with the statistical hypothesis test including the first feature and the second feature; and the generating the graph including at least a subset of the one or more of the first result data or the second result data within the experiment time period to indicate an effect of the one or more of the first feature or the second feature prior to an end of the experiment time period.

13. A system comprising:

at least a first user device;

at least a second user device;

a server comprising one or more memories storing computer-executable instructions, and one or more hardware processors configured to execute the computer-executable instructions to:
  determine an experiment treatment time period associated with a statistical hypothesis test comprising a first feature of a user experience and a second feature of the user experience;
  present to the at least the first user device the first feature during a first control period extending from subsequent to an experiment start time to an experiment end time of an experiment time period, the experiment time period being less than the experiment treatment time period;
  present to the at least the first user device the first feature for a second control period, the second control period having at least a portion of the second control period beginning prior to the experiment start time and extending to the first control period;
  present to the at least the second user device the second feature during a first treatment period beginning subsequent to a beginning of the first control period and extending to the experiment end time of the experiment time period;
  present to the at least the second user device the second feature during a second experiment period beginning at the experiment end time, the second experiment period having a length equal to the difference between the experiment treatment time period and the first treatment period, and a total length of the first treatment period and the second treatment period is equal to a length of the first control period and the second control period;
  receive, from the first user device, first control data from the first control period and second control data from the second control period, the first control data and the second control data associated with the first feature of the user experience;
  receive, from the second user device, first treatment data from the first treatment period and second treatment data from the second treatment period, the first treatment data and the second treatment data associated with the second feature of the user experience;
  determine result data based at least partially on one or more of the first control data, the second control data, the first treatment data, or the second treatment data;
  process the result data to determine an effect of the one or more of the first feature or the second feature; and
  present a graph reflecting the effect of the one or more of the first feature or the second feature, the graph providing an indication of whether to implement the one or more of the first feature or the second feature.

14. The system of claim 13, further comprising computer-executable instructions to:
  determine first time data associated with the first control period and the second control period, wherein the first time data is indicative of a first variation of at least one metric associated with the first feature of the user experience;
  determine second time data associated with the first treatment period and the second treatment period, wherein the second time data is indicative of a second variation of the at least one metric associated with the second feature of the user experience; and
  modify the result data based at least partially on one or more of the first time data or the second time data.

15. The system of claim 13, further comprising computer-executable instructions to:
  determine a first plurality of values of the at least one metric associated with the first feature, wherein the first plurality of values corresponds to a first plurality of times within one or more of the first control period or the second control period;
  determine a second plurality of values of the at least one metric associated with the second feature, wherein the second plurality of values corresponds to a second plurality of times within one or more of the first treatment period or the second treatment period;
  the graph further including a first graph associating the first plurality of values with the first plurality of times and a second graph associating the second plurality of values with the second plurality of times; and
  provide one or more of the first graph or the second graph to the server.

16. The system of claim 13, further comprising computer-executable instructions to:
  determine a first plurality of values of the at least one metric associated with the first feature, wherein the first plurality of values corresponds to the first plurality of times within the one or more of the first control period or the second control period;
  determine a second plurality of values of the at least one metric associated with the second feature, wherein the second plurality of values corresponds to a second plurality of times within one or more of the first treatment period or the second treatment period;
  determine a plurality of differences between the first plurality of values and the second plurality of values, the graph associating the plurality of differences with a third plurality of times having a length corresponding to one or more of the first plurality of times or the second plurality of times; and
  provide the graph to server.

17. The system of claim 13, further comprising computer-executable instructions to:
  determine a plurality of values of at least one metric associated with the one or more of the first feature or the second feature, wherein the plurality of values corresponds to a plurality of times within the one or more of the first control period, the second control period, the first treatment period, or the second treatment period; and
  wherein the computer-executable instructions to determine the result data further include computer-executable instructions to determine one or more of a rate of change of the plurality of values or a steady state of the plurality of values.

18. The system of claim 13, further comprising computer-executable instructions to:
  determine an initial presentation of the first feature to the first user device prior to the experiment time period during the second control period.

19. The system of claim 13, further comprising computer-executable instructions to:
  determine an initial presentation of the second feature to the second user device during the first treatment period within the experiment time period;
  determine an end of the experiment time period;
  determine values associated with at least one metric corresponding to the second feature during the second treatment period, wherein the second treatment period corresponds to a period of time subsequent to the end of the experiment time period; and
  store the values in association with the second user data.

20. The system of claim 13, further comprising computer-executable instructions to:
- determine a first value of at least one metric associated with the one or more of the first feature or the second feature, wherein the first value is indicative of a first response from one or more of the first user device or the second user device to initiate a trial of a good or service; and
- determine a second value of the at least one metric associated with the one or more of the first feature or the second feature, wherein the second value is indicative of a second response from the one or more of the first user device or the second user device to purchase the good or service,
- wherein the first value is determined during the experiment time period, and
- wherein the second value is determined subsequent to the experiment time period.

\* \* \* \* \*